(12) United States Patent
Xie

(10) Patent No.: US 7,982,750 B2
(45) Date of Patent: Jul. 19, 2011

(54) TEST-WEARING IMAGE PRODUCING METHOD FOR PERSONAL PRODUCTS

(76) Inventor: Yiling Xie, Arcadia, CA (US)

(*) Notice: Subject to any disclaimer, the term of this patent is extended or adjusted under 35 U.S.C. 154(b) by 707 days.

(21) Appl. No.: 12/151,061

(22) Filed: May 1, 2008

(65) Prior Publication Data

US 2009/0273612 A1    Nov. 5, 2009

(51) Int. Cl.
*G09G 5/00* (2006.01)
(52) U.S. Cl. .......................... 345/624; 345/626
(58) Field of Classification Search .......... 345/624–627, 345/629–634
See application file for complete search history.

(56) References Cited

U.S. PATENT DOCUMENTS

| | | | |
|---|---|---|---|
| 5,983,201 A | 11/1999 | Fay | |
| 6,791,584 B1 | 9/2004 | Xie | |
| 6,847,383 B2 * | 1/2005 | Agnew | 345/660 |
| 7,292,242 B1 * | 11/2007 | Wittenbrink et al. | 345/421 |
| 2003/0107585 A1 * | 6/2003 | Samuelson | 345/629 |

* cited by examiner

*Primary Examiner* — Ryan R Yang
(74) *Attorney, Agent, or Firm* — Raymond Y. Chan; David and Raymond Patent Firm

(57) ABSTRACT

A method for test-wearing image producing method for a personal product includes the steps of: posting a base image layer which contains an image of a wearer; defining a display area and a masking area on the base image layer in responsive to the personal product being physically worn by the wearer; selecting a product image layer containing an image of the personal product to locate on the base image layer; and creating a test-wearing image, wherein a portion of the image of the personal product within the display area is visibly shown on the image of the wearer while a portion of the image of the personal product within the masking area is invisibly hidden, such that the test-wearing image contains a virtual appearance of the wearer physically wearing the personal product.

34 Claims, 16 Drawing Sheets

FIG.4A

TEST-WEARING IMAGE PRODUCING METHOD FOR PERSONAL PRODUCTS

BACKGROUND OF THE PRESENT INVENTION

1. Field of Invention

The present invention relates to a test-wear method of a personal product, and more particularly to a system and method of producing test-wearing image for personal products, wherein a test-wearing image containing a virtual appearance of the wearer physically wearing the personal product is generated to simulate the actual wearing image for the wearer.

2. Description of Related Arts

Every user would like to test wear all favor personal products, such as spectacles, watches, jewelries, of different styles so as to ensure which style fits his or her the most before he or she purchases. Although there are thousands of new personal products in market, each shop may only provide a very limited number of selected personal products in stock. The user may miss the chance of trying some other product designs before making decision. On the other hands, a retail shop may lose a potential customer simply because it fails to carry a particular personal product that the customer likes.

Due to the rapid development of the Internet, nearly every family in the United States has at least a computer that enables people to shopping through Internet. Numerous spectacle webs are available in Internet, each of which provides pictures of all kinds of personal products for the consumers to purchase. However, most of the users would like to test-wear the selected personal product to ensure it fits his or her before purchasing.

For example, an eyeglasses wearer would like to go to visit a spectacle shop to choose and physically wearer different styles of spectacle frame. However, the spectacle shop may only provide a very limited number of selected spectacle frames in stock. Alternatively, the wearer may simply shop the spectacle shop through Internet. U.S. Pat. No. 5,983,201, owned by Fay, discloses a method for a customer to test-wear the eyeglass frame through a personal computer that how the customer would appear wearing different eyeglass frame fitted, electronically to the customer. Accordingly, the method requires the customer to physically visit a Customer Diagnostics Location for sizing and imaging the customer in order to confirm the customer's head, face and skin color, sex etc. needed to size the eyeglasses. Therefore, the customer is able to access a Remote Electronic Store to try on frames and inspect frame product on the image of the customer. It is no doubt that the customer is able to test wear all the frames before placing a purchasing order on the selected frame. However, the method has several drawbacks.

The image of the customer must be restrictedly examined by the Customer Diagnostics Location to ascertain the image of the customer that the image thereof is qualified to be used in the Remote Electronic Store for matching the frames. In other words, the customer is appointed to obtain the image thereof at the Customer Diagnostics Location even the customer cannot find any frame matching the image at the Customer Diagnostics Location. Furthermore, the location of the Customer Diagnostics Location may not close to the house or office of the customer such that the customer must look for the closest location of the Customer Diagnostics Location. As a result, the customer may merely waste lots of time and/or money to visit the Customer Diagnostics Location and the Customer Diagnostics Location in comparison with the conventional method of visiting the retail optical shop.

In addition, when the face of the customer has changed due to the age or weight, the customer may merely visit the Customer Diagnostics Location again to obtain an updated image. In other words, the customer may visit the Customer Diagnostics Location once a year because the optometrist suggests everyone should have an eye examination for every year.

In relation to shopping of optical products, the main hassle is that the customer must visit the optometry to get the prescription, select the desirable spectacle frame, and then place the corresponding order. After an agreed period of time, the customer has to revisit the retail shop again to pick up the spectacle. Many peoples do not want this to be so but they have no choice because seemingly this is the only way of buying a spectacle.

Furthermore, the frame image of the Remote Electronic Store does not match with the facial image of the customer because the end portions of the temples of the frame image are overlapped on the outer sides of the facial image of the customer respectively. It is known that when the customer wears the spectacle frame, the end portions of the temples are hidden behind the auricles of the customer's ears respectively. Otherwise, the end portions of the temples are covered by the hairs of the customer especially for the lady having a long hair. In fact, when the customer physically wears the spectacle frame, the pupils of the customer may not perfectly match with two focus points of the spectacles. Generally speaking, the focus points of the spectacles are slightly offset to the pupils of the customer due to the weight of the spectacles and the movement of the customer. In other words, no matter how the spectacle image being adjusted its size in responsive to the size of the facial image of the customer, the spectacle image cannot be matched with the facial image of the customer naturally.

The inventor of the present invention disclosed a method of scaling a face image with a spectacle frame image through computer in U.S. Pat. No. 6,791,584, which enables the user to view on a computer how his or her face looks like while fitly wearing various kinds of spectacle frame. The method comprises the steps of: (a) providing a spectacle frame image of a spectacle frame in a computer and determining a mid-point of the spectacle frame image, wherein the spectacle frame image is a front view of the spectacle frame without temples; (b) determining a frame scale of the spectacle frame image on a computer display screen of the computer with respect to a real size of the spectacle frame; (c) providing a face image of a user on the computer display screen by inputting a front face picture of the user into the computer; (d) providing a pair of pupil marks on the computer display screen; (e) moving the pair of pupil marks to two pupils of the face image by means of a computer input device of the computer until the two pupil marks are positioned concentrically with the two pupils of the face image, wherein a distance between the two pupil marks positioned on the two pupils of the face image is measured and recorded in the computer as an image pupil distance of the face image; (f) inputting a real pupil distance of the user into the computer and determining a face scale of the face image by comparing the real pupil distance with the image pupil distance; (g) adjusting the face scale and the frame scale to the same scale value so as to render both sizes of the face image and the spectacle frame image being proportionally displayed on the computer display screen; and (h) overlapping the spectacle frame image on the face image on the computer display screen until a middle point between the two pupil marks or the two pupils is overlapped with the mid-point of the spectacle frame image on the computer display screen.

The present invention is an improvement of the above mention U.S. Pat. No. 6,791,584 to calibrate a frame scale of the spectacle image with respect to the facial image. After the corresponding frame scale is determined, the image of the spectacle frame can be proportionally overlapped on the facial image of the wearer. In particularly, all personal products, including the spectacle frame, can be formed as a product image to overlap on the image of the wearer to create a test-wearing image. The present invention further enhances the test-wearing image containing a virtual appearance of the wearer physically wearing the personal product is generated to simulate the actual wearing image for the wearer.

SUMMARY OF THE PRESENT INVENTION

An object of the present invention is to provide a system and method of producing test-wearing image for personal products, wherein a test-wearing image containing a virtual appearance of the wearer wearing the personal product is generated to simulate the actual wearing image for the wearer.

Another object of the present invention is to provide a system and method of producing test-wearing image for personal products, wherein two or more product images can be concurrently posted on the posting platform to overlap with the base image layer. Therefore, the test-wearing image contains a virtual appearance of the wearer physically wearing two or more different personal products at the same time.

Another object of the present invention is to provide a system and method of producing test-wearing image for personal products, which provides a simple and precise frame calibrating operation to calibrate a frame scale of the image of the personal product with respect to the image of the wearer.

Another object of the present invention is to provide a system and method of producing test-wearing image for personal products, wherein the wearer is able to shop the personal products through a public communication network, such that the wearer is able to customize the personal products through the public communication network to selectively match the image with the personal products without actually wearing on the personal products.

Another object of the present invention is to provide a system and method of producing test-wearing image for personal products, wherein the wearer is able to optimize the personal products through the public communication network to selectively match his/her image with the personal products in a rapid and accurate manner.

Another object of the present invention is to provide a system and method of producing test-wearing image for personal products, wherein the wearer is able to update the image anytime by using a digital camera, a web cam, scanning a photo, and etc., such that the wearer is able to shop the personal products anytime by a click of a mouse.

Another object of the present invention is to provide a system and method of producing test-wearing image for personal products, wherein the system will only require two different layers, i.e. the base image layer and the product image layer, to post on the posting platform such that the system will save lots of memory space. In particularly, the product database requires less memory space to store one single personal product in different images.

Another object of the present invention is to provide a system and method of producing test-wearing image for personal products, wherein when the wearer provides a color image, the color of the personal product can be selected to match with the skin color of the user once the shape and size of the personal produce is selected. Therefore, the test-wearing image is shown as a mirror image to show how the wearer would appear while wearing the personal product with the selected shape, size, and color.

Another object of the present invention is to provide a system and method of producing test-wearing image for personal products, wherein an image effect is applied to the image of the personal product to enhance the test-wearing image of the virtual appearance of the wearer wearing the personal product. The image effect includes a fade out effect to gradually diminish the image of the personal product from the display area to the masking area of the base image layer, a light reflective effect to generate a light reflection of the image of the personal product, a shading effect to simulate a shading of the personal product on the image of the wearer, and a color blending effect to blend a color of the image of the personal product with a color of the image of the wearer.

Another object of the present invention is to provide a system and method of producing test-wearing image for personal products, wherein the system can calibrate the image in different angles, such as a three quarter face position, to match the frame scale of the personal product with the image of the wearer so as to provide alternative view of the appearance.

Another object of the present invention is to provide an economic and efficient solution for providing a method and system for the wearer to test-wear the personal products through the public communication network or computer.

Accordingly, in order to accomplish the above objects, the present invention provides a test-wearing image producing method for a personal product, comprising the steps of:

(a) posting a base image layer which contains an image of a wearer;

(b) defining a display area on the base image layer and a masking area on the base image layer in responsive to the personal product to be worn by the wearer;

(c) locating a selected product image layer on the base image layer in an adjustably movable manner, wherein the product image layer contains an image of the personal product; and (d) creating a test-wearing image when the product image layer is overlapped on the base image layer, wherein a portion of the image of the personal product within the display area is visibly shown on the image of the wearer while a portion of the image of the personal product within the masking area is invisibly hidden, such that the test-wearing image contains a virtual appearance of the wearer physically wearing the personal product.

The present invention further comprises a system of the present invention comprises an optimization center, a posting platform, and a test-wearing generator.

The optimization center has a product database, which is adapted for a wearer to access, containing a plurality of digital images of the personal products for the user to select.

The posting platform, which is communicatively linked to the product database, is arranged for the wearer posting the base image layer and the product image layer on the posting platform.

The test-wearing generator, which is communicatively linked to the posting platform, comprises a masking processor defining the display area and the masking area on the base image layer in responsive to the personal product being worn by the wearer, and a test-wearing image creator creating the test-wearing image when the product image layer is overlapped on the base image layer.

These and other objectives, features, and advantages of the present invention will become apparent from the following detailed description, the accompanying drawings, and the appended claims.

BRIEF DESCRIPTION OF THE DRAWINGS

FIG. 4A illustrates an interface of the production system according to the above preferred embodiment of the present invention.

DETAILED DESCRIPTION OF THE PREFERRED EMBODIMENT

Referring to FIGS. 1 to 6 of the drawings, a test-wearing image system and producing method for a personal product according to a preferred embodiment of the present invention is illustrated, wherein the system is adapted for generating a photo realistic effect on a display to simulate a wearing image for the wearer.

According to the preferred embodiment, the test-wearing image producing method, as shown in FIGS. 1 to 6B, comprises the following steps.

Figure 1:
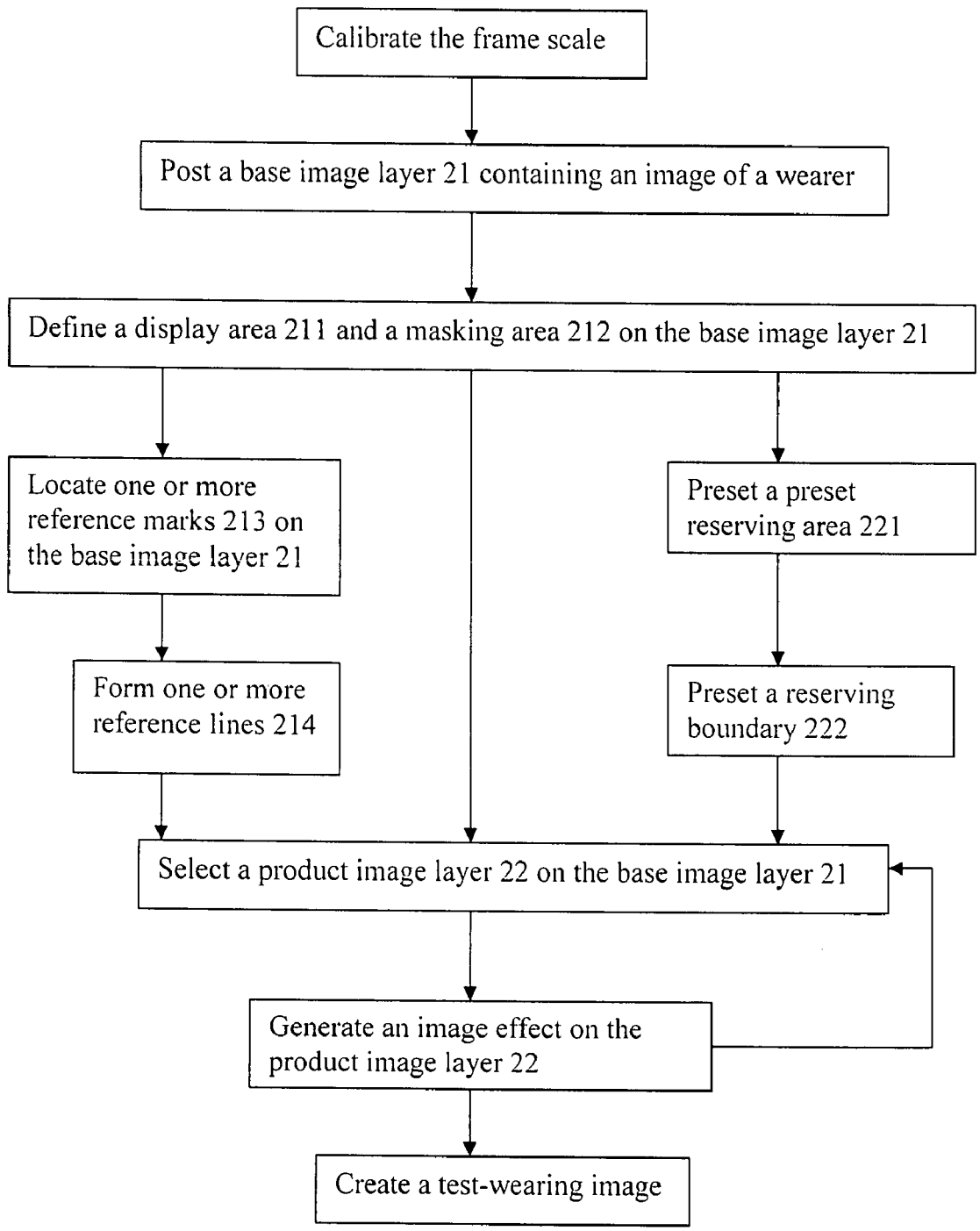
FIG. 1 is a flow diagram illustrating a test-wearing image producing method for a personal product according to a preferred embodiment of the present invention.
Figure 2:
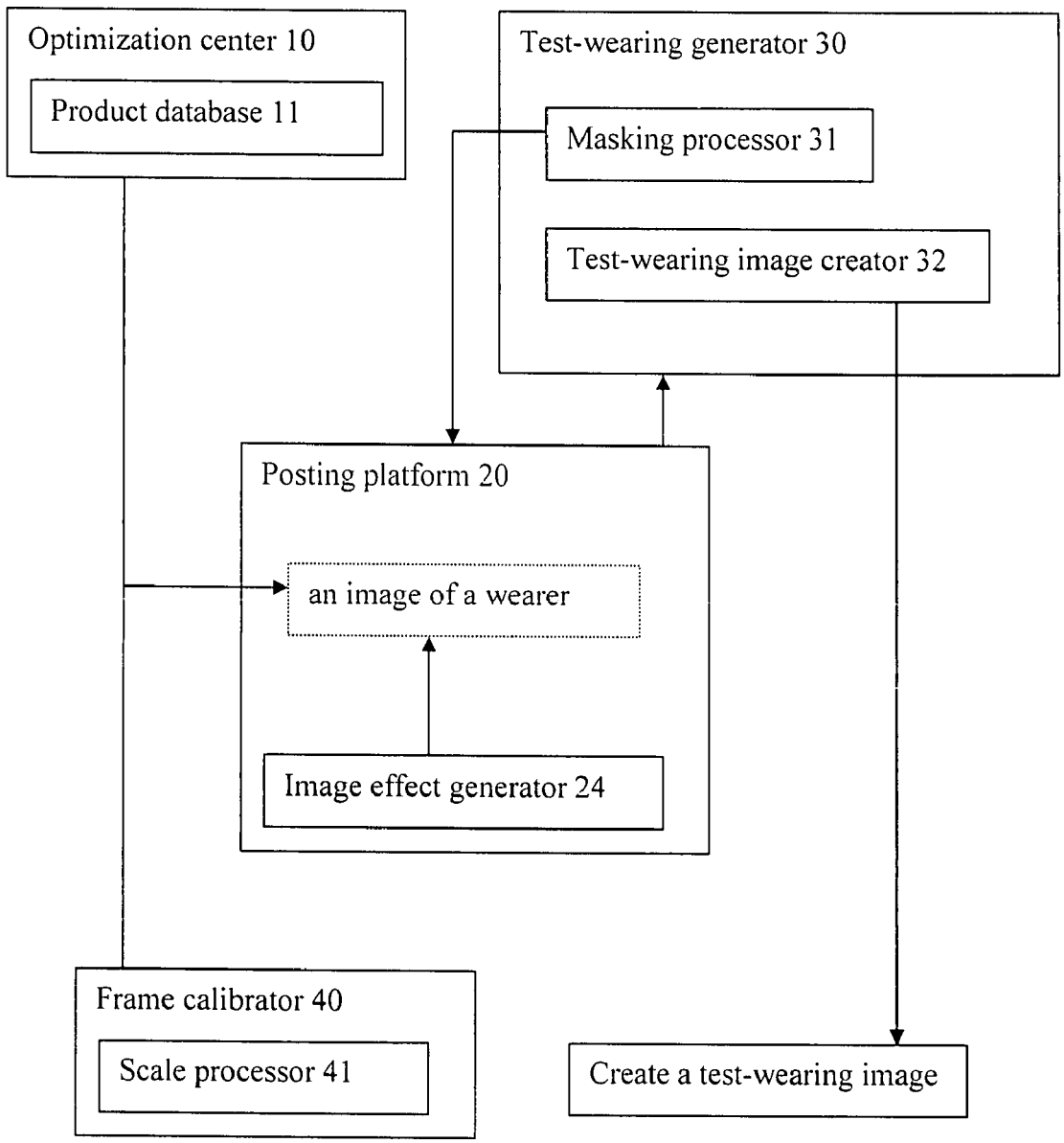
FIG. 2 is a block diagram illustrating the test-wearing image producing system for a personal product according to the above preferred embodiment of the present invention.
Figure 3:
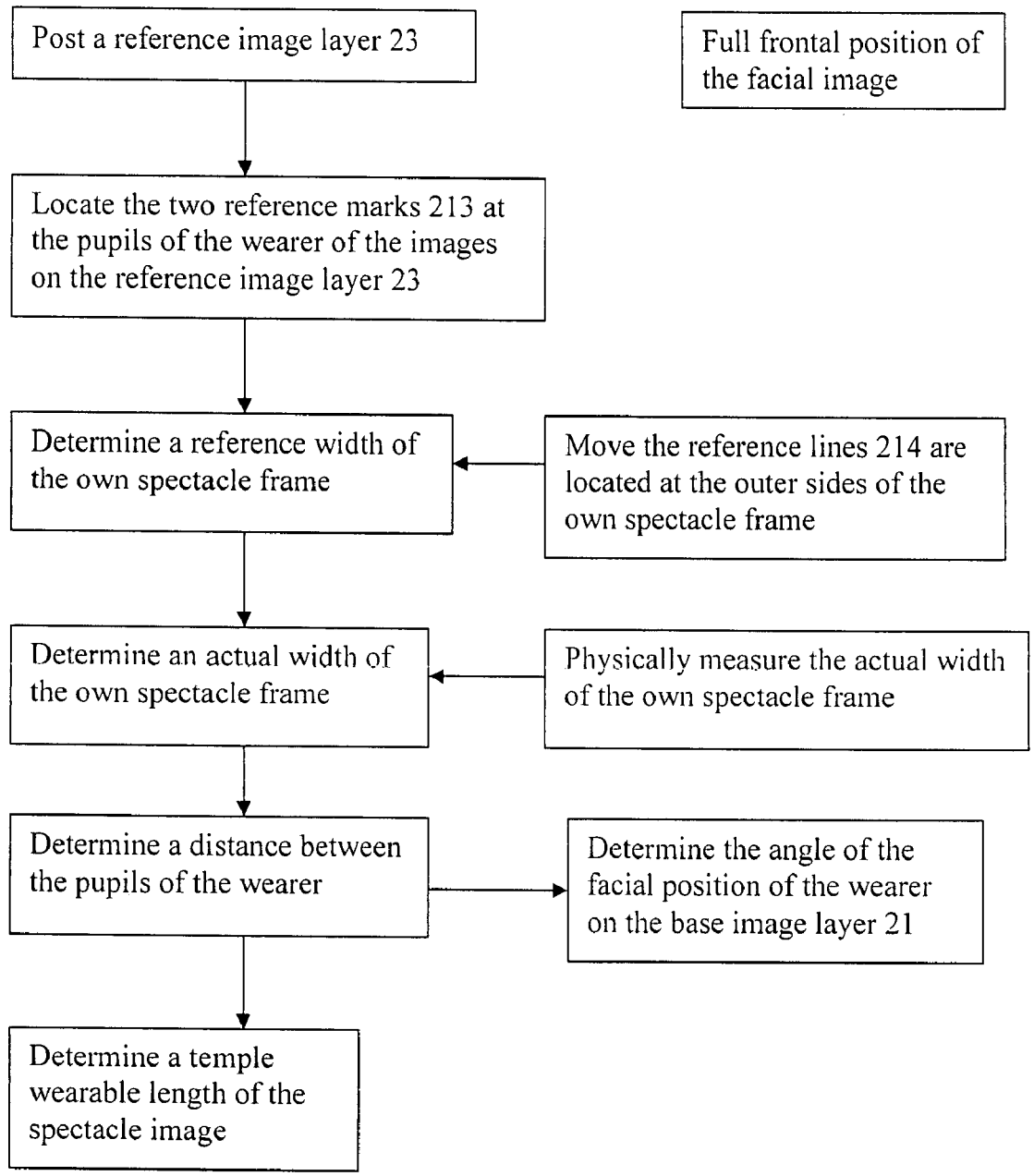
FIG. 3 is a flow diagram illustrating a calibrating process a frame scale of the spectacle image with respect to the facial image according to the above preferred embodiment of the present invention.
Figure 4A:
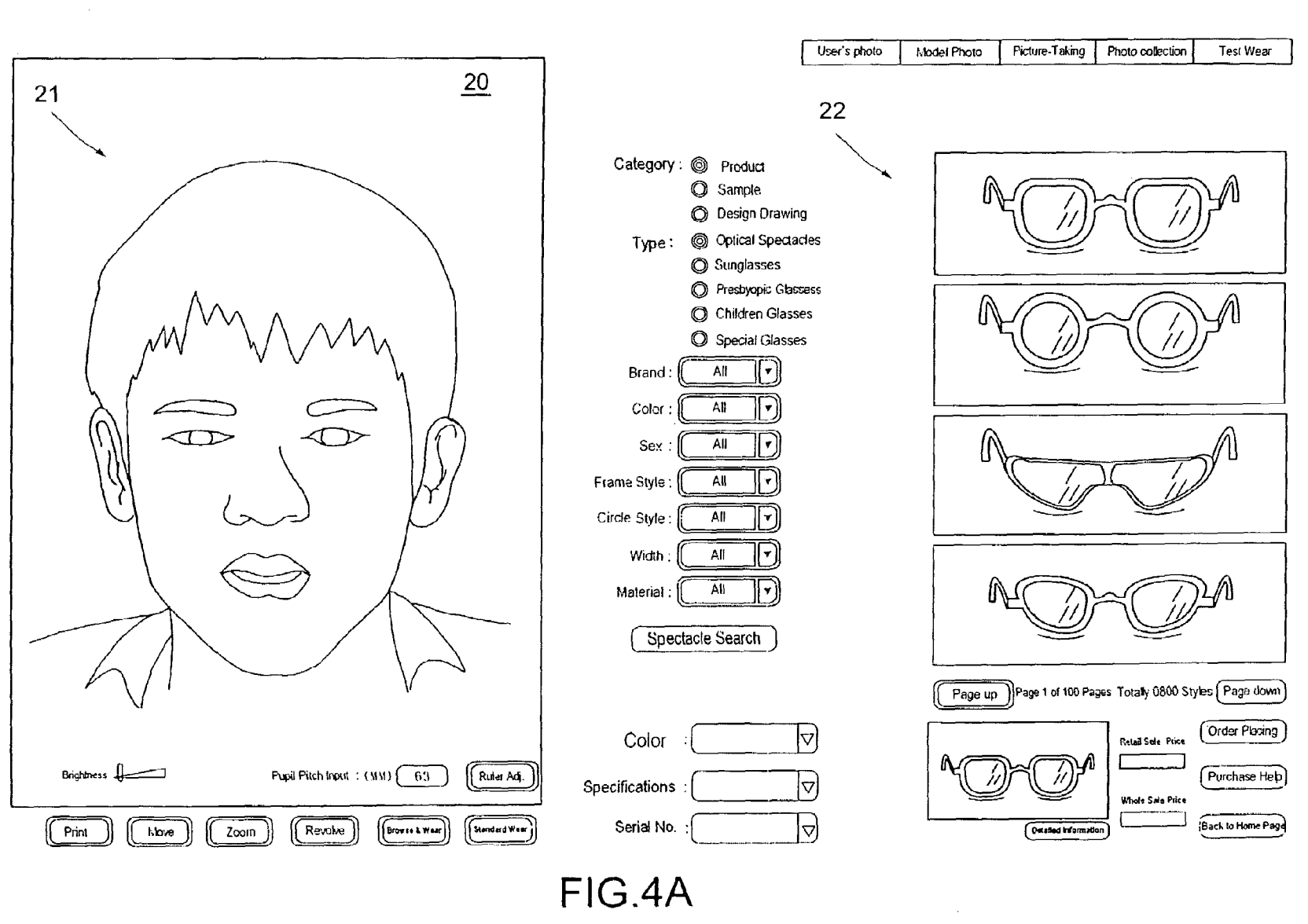

(1) Post a base image layer 21 which contains an image of a wearer, as shown in FIGS. 1 and 4A.

Figure 4B:
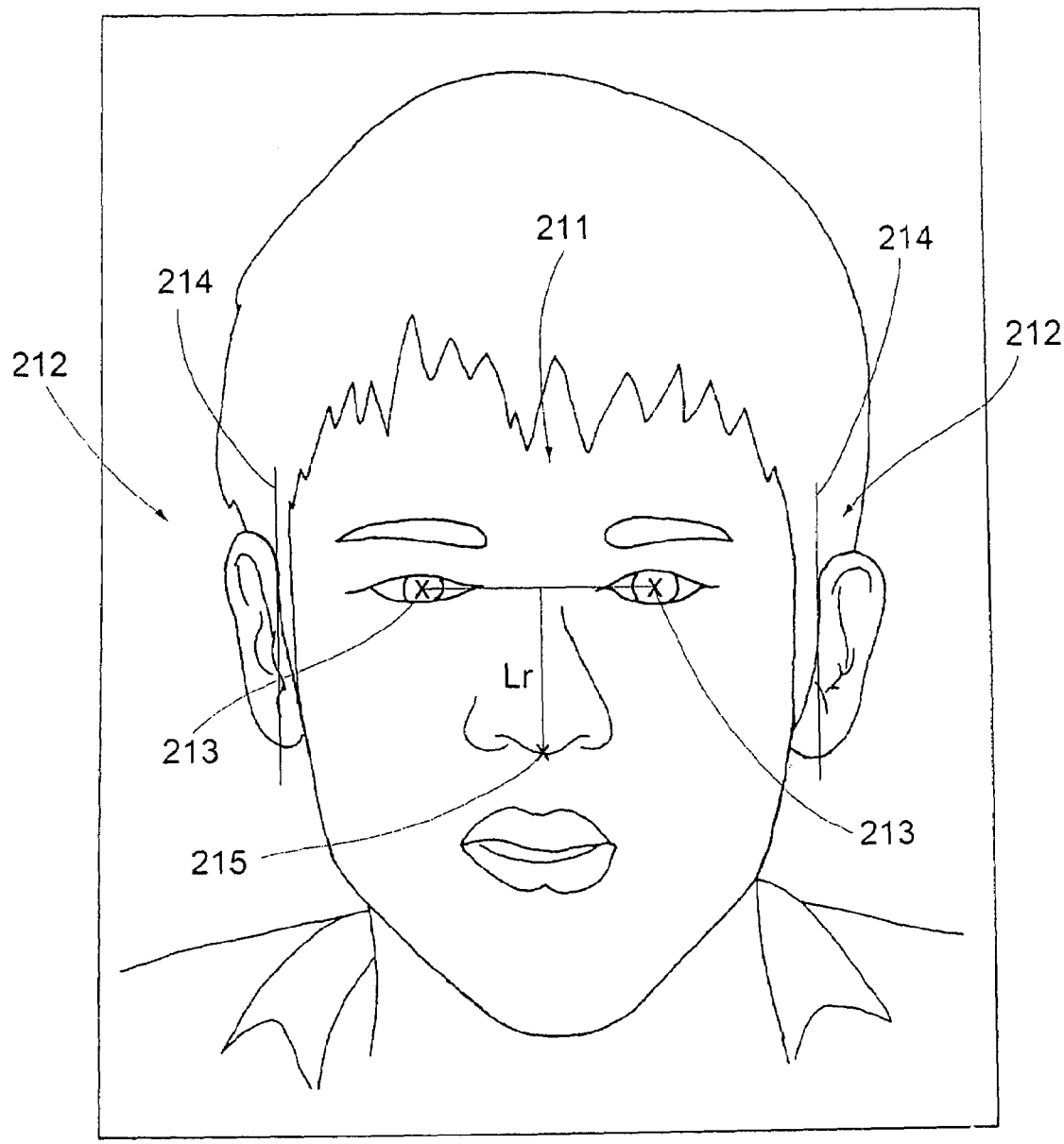
FIGS. 4B and 4C illustrate a base image layer of the production system according to the above preferred embodiment of the present invention.
Figure 4C:
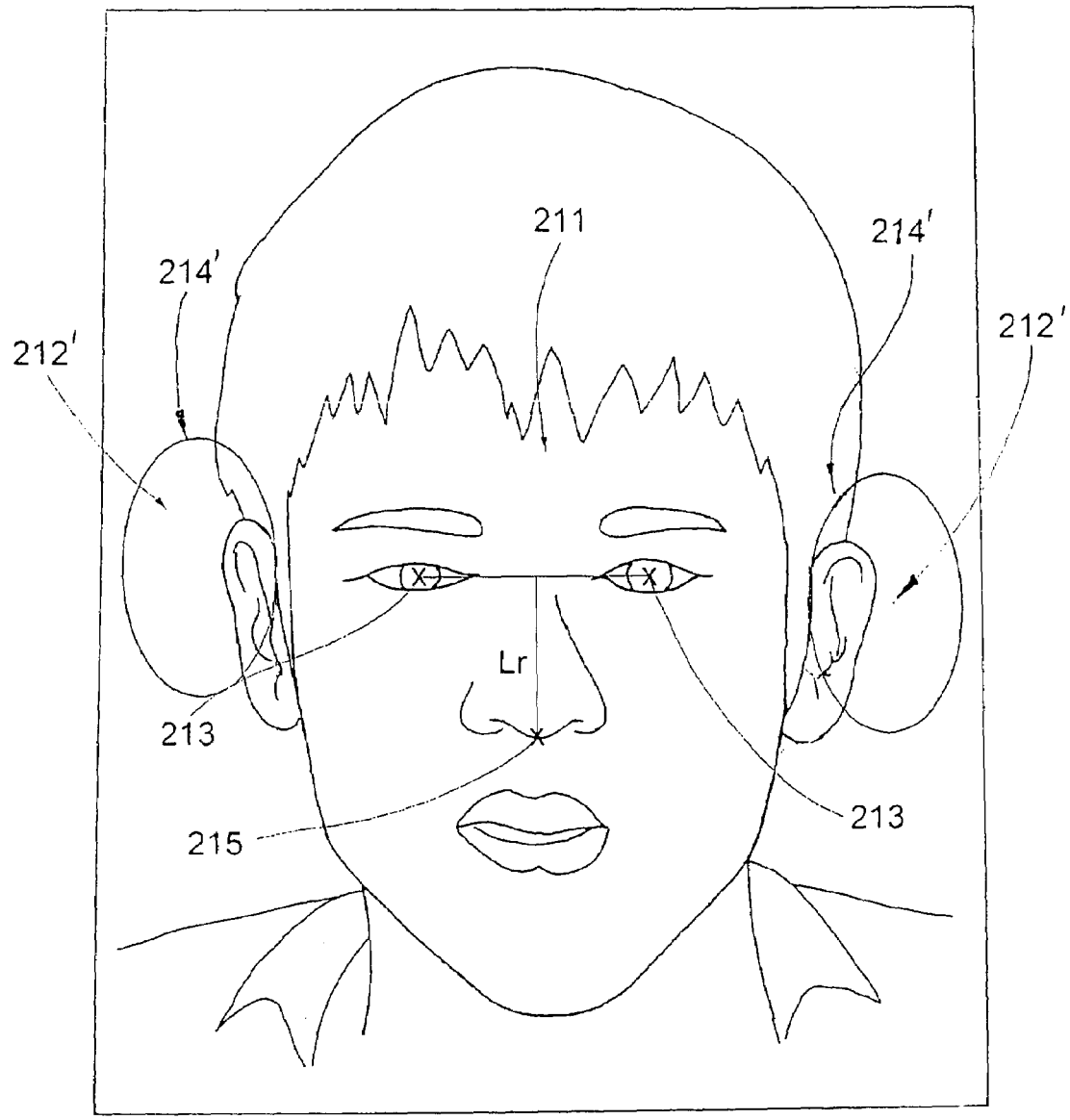

(2) Define a display area 211 on the base image layer 21 and a masking area 212 or 212' on the base image layer 21 in responsive to the personal product being physically worn by the wearer, as shown in FIGS. 4B and 4C.

Figure 5:
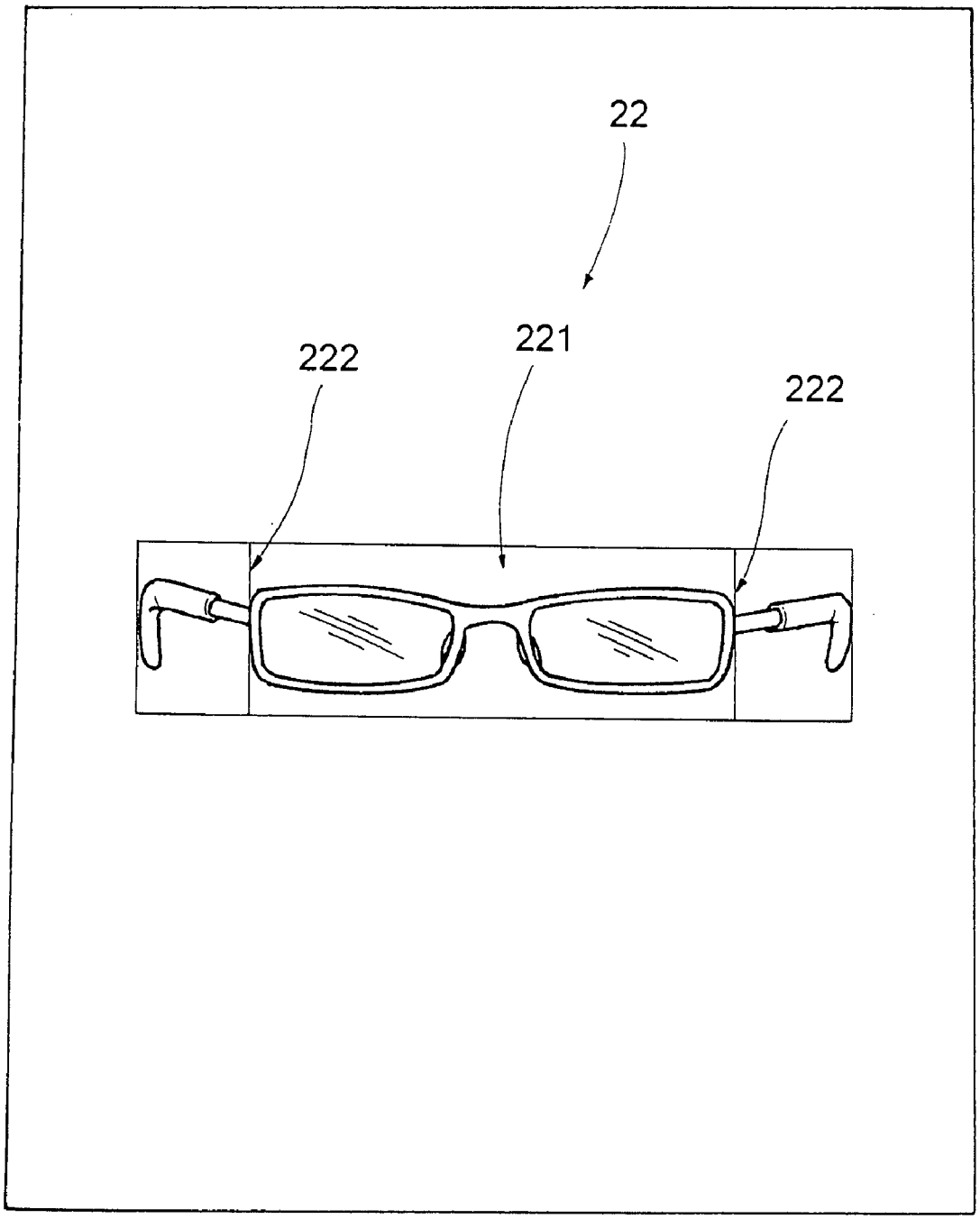
FIG. 5 illustrates a product image layer of the production system according to the above preferred embodiment of the present invention.
Figure 6A:
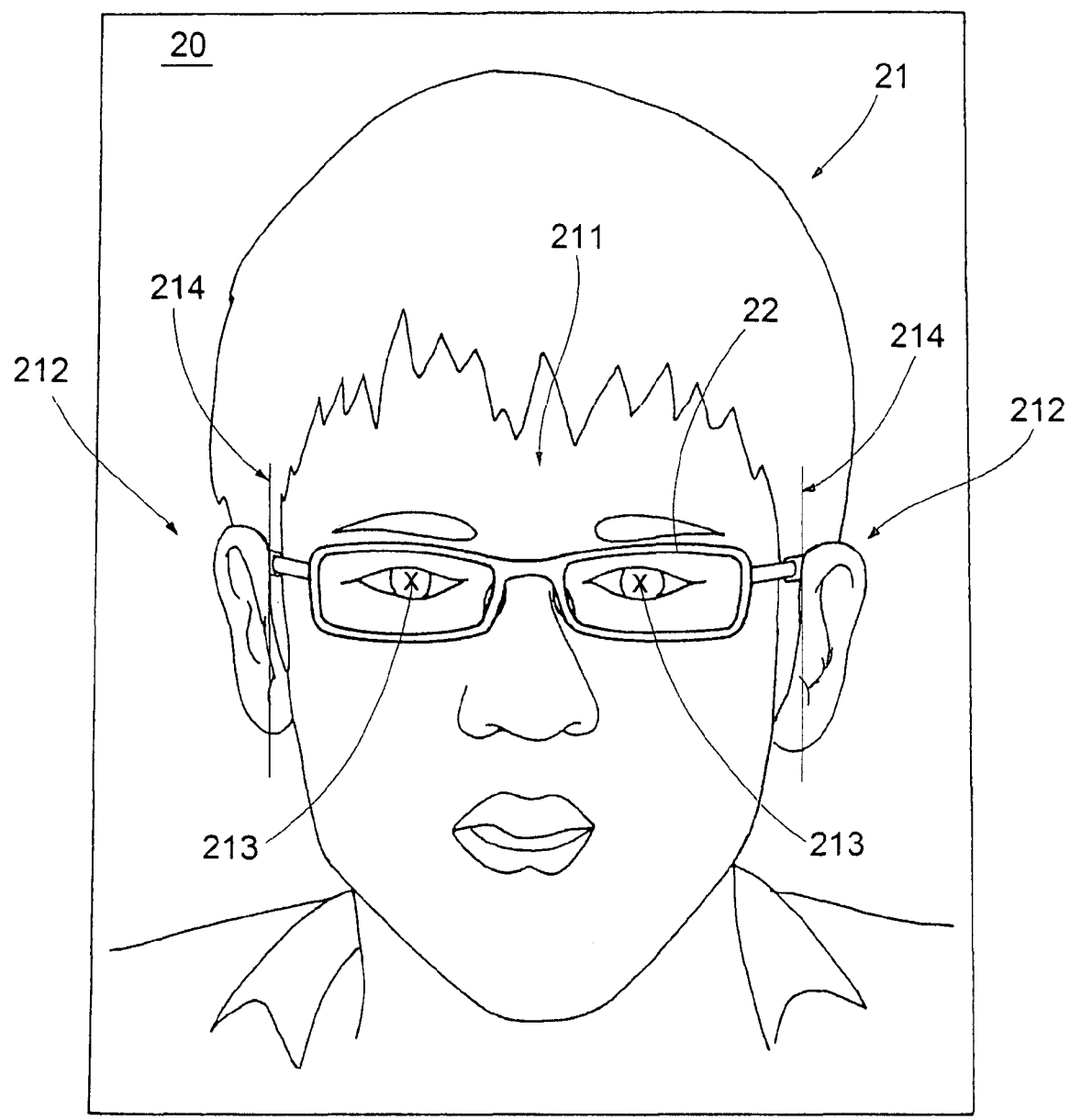
FIGS. 6A and 6B illustrate a test-wearing image of the production system according to the above preferred embodiment of the present invention.
Figure 6B:
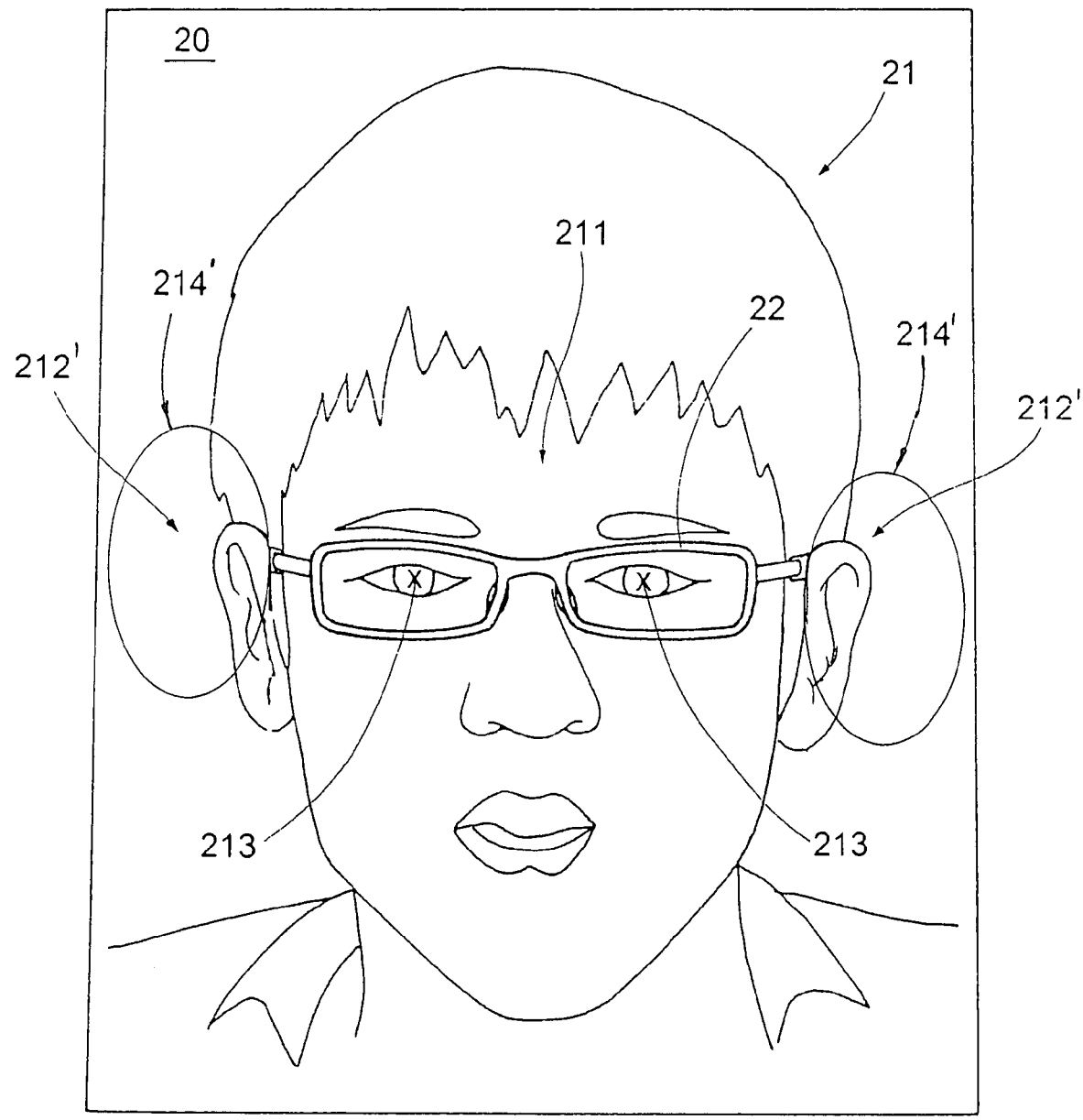

(3) Locate a selected product image layer 22 on the base image layer 21 in an adjustably movable manner, wherein the product image layer 22 contains an image of the personal product, as shown in FIGS. 5 to 6B.

(4) Create a test-wearing image when the product image layer 22 is overlapped on the base image layer 21, wherein a portion of the image of the personal product within the display area 211 is visibly shown on the image of the wearer while a portion of the image of the personal product within the masking area 212 or 212' is invisibly hidden, such that the test-wearing image contains a virtual appearance of the wearer physically wearing the personal product, as shown in FIGS. 6A and 6B.

According to the preferred embodiment, the system of the present invention comprises an optimization center 10, a posting platform 20, and a test-wearing generator 30.

The optimization center 10 has a product database 11, which is adapted for a wearer to access, containing a plurality of digital images of the personal products for the user to select. The optimization center 10 can be a software containing the system of the present invention for installing into the personal computer or can access the system of the present invention through a communication network such as Internet.

The posting platform 20, which is communicatively linked to the frame database 11, is arranged for the wearer posting the base image layer 21 and the product image layer 22 on the posting platform 20.

As shown in FIG. 4A, detail information can also be input to make an advance inquiry, wherein the detail information contains the height and weight of the user, and the facial shape of the wearer. Accordingly, by inputting the gender, age, race, height and weight of the wearer, the corresponding image size of the spectacle frame can be presumably filtered from the product database 11. In particularly, having the facial shape of the wearer, such as round shape or oval shape, the distance between the two pupils of the user can be presumable calculated. It is worth to mention that the information of gender, age height, weight, and facial shape of the user can only used for test wearing purpose.

The test-wearing generator 30, which is communicatively linked to the posting platform 20, comprises a masking processor 31 defining the display area 211 and the masking area 212 or 212' on the base image layer 21 in responsive to the personal product to be worn by the wearer, and a test-wearing image creator 32 creating the test-wearing image when the product image layer 22 is overlapped on the base image layer 21, as shown in FIGS. 6A and 6B. After the test-wearing image is created, the wearer can save the corresponding personal product selected by the wearer and the settings of the base image layer 21 and the product image layer 22.

According to the preferred embodiment, the personal product can be a watch, an ear ring, a necklace, and etc. that the personal product can be worn by the wearer. Preferably, the personal product is embodied as a spectacle frame to be worn by the wearer in which the spectacle frame requires a precise alignment for the wearer to wear. Accordingly, the following example illustrates the operation of the test-wearing system for the spectacle frame.

In the step (1), the wearer can access the optimization center 10 to post one or more photos of image of the wearer(s) on the posting platform 20, wherein the images of the wearers can be the images of the users or the image of the model wearers preloaded in the system. In other words, a user can post one or more his or her own photos on the posting platform 20 to simulate the test-wearing image of the user wearing the personal product or can select the photo of one of the model wearers on the posting platform 20 to simulate the test-wearing image of the model wearer wearing the personal product.

For the spectacle test-wearing example, the image of the wearer is facial image of the wearer and the image of the personal product is an image of the spectacle frame, such that the test-wearing image contains the virtual appearance of the wearer wearing the spectacle frame. Each image of the spectacle frames contains the image of the frame body including the two temples and the spectacle bridge, and preferably the lenses, as shown in FIG. 5.

After the base layer image 21 is shown on the posting platform 20, the display area 211 and the masking area 212 or 212' must be defined on the base layer image 21 in the step (2). As shown in FIG. 4B, the display area 211 is set between two facial side peripherals of the facial image while the masking area 212 or 212' is set at each of auricle areas of the facial image, such that when the product image layer 22 is overlapped on the base image layer 21, a corresponding portion of the image of the spectacle frame within the display area 211 is visibly shown between the facial side peripherals of the facial image while another portion of the image of the spectacle frame within the masking area 212 or 212' is invisibly hidden to generate the test-wearing image containing the virtual appearance of the wearer wearing the spectacle frame.

Therefore, when the product image layer 22 is overlapped on the base image layer 21, the frame body of the spectacle frame is aligned within the display area 211 to overlap on the facial image of the wearer. In addition, the rear portions of the temples are aligned within the masking area 212 or 212' such that the rear portions of the temples are invisibly hidden on the test-wearing image.

In the step (2), as shown in FIG. 4B, the method comprises a step of (2.1) locating one or more reference marks 213 on the base image layer 21 to define the display area 211 and the masking area 212 or 212' in responsive to the reference marks 213, and locating two masking marks 214 at the facial side peripherals of the facial image respectively on the base image layer 21, wherein a distance between the two masking marks 214 is set to be larger than a distance between the two reference marks 213.

In particularly, two reference marks 213 are selectively located at two pupils of the wearer of the image thereof and the two masking marks 214 are preferred to be located at the conjunctions of the ears and the sideburns of the facial image respectively on the base image layer 21, where the tail portions of the temples will be hidden by the ears of the wearer from the front appearance.

Referring to FIG. 4B, the two masking marks 214 are embodied as two parallel lines set to locate at the two conjunctions of the ears and the sideburns of the facial image respectively, so that the display area 211 is set between the masking marks 214, i.e. between two facial side peripherals of the facial image and the masking area 212 is set an area out of each of the masking marks 214, i.e. each of auricle areas of the facial image.

Alternatively, as shown in FIG. 4C, the two masking marks 214' are embodied as two oval shaped marks each encircling portion or the whole ear on each side of the facial image while the contour lines of the oval marks pass the two conjunctions of the ears and the sideburns of the facial image respectively. The masking area 212' which is the area encircled by each of the oval shaped masking marks 214' should large enough to cover the tail portion of the respective temple to be hidden by the respective ear. The masking area 212' can be changed by changing the size of the oval masking mark 214'.

Figure 7:
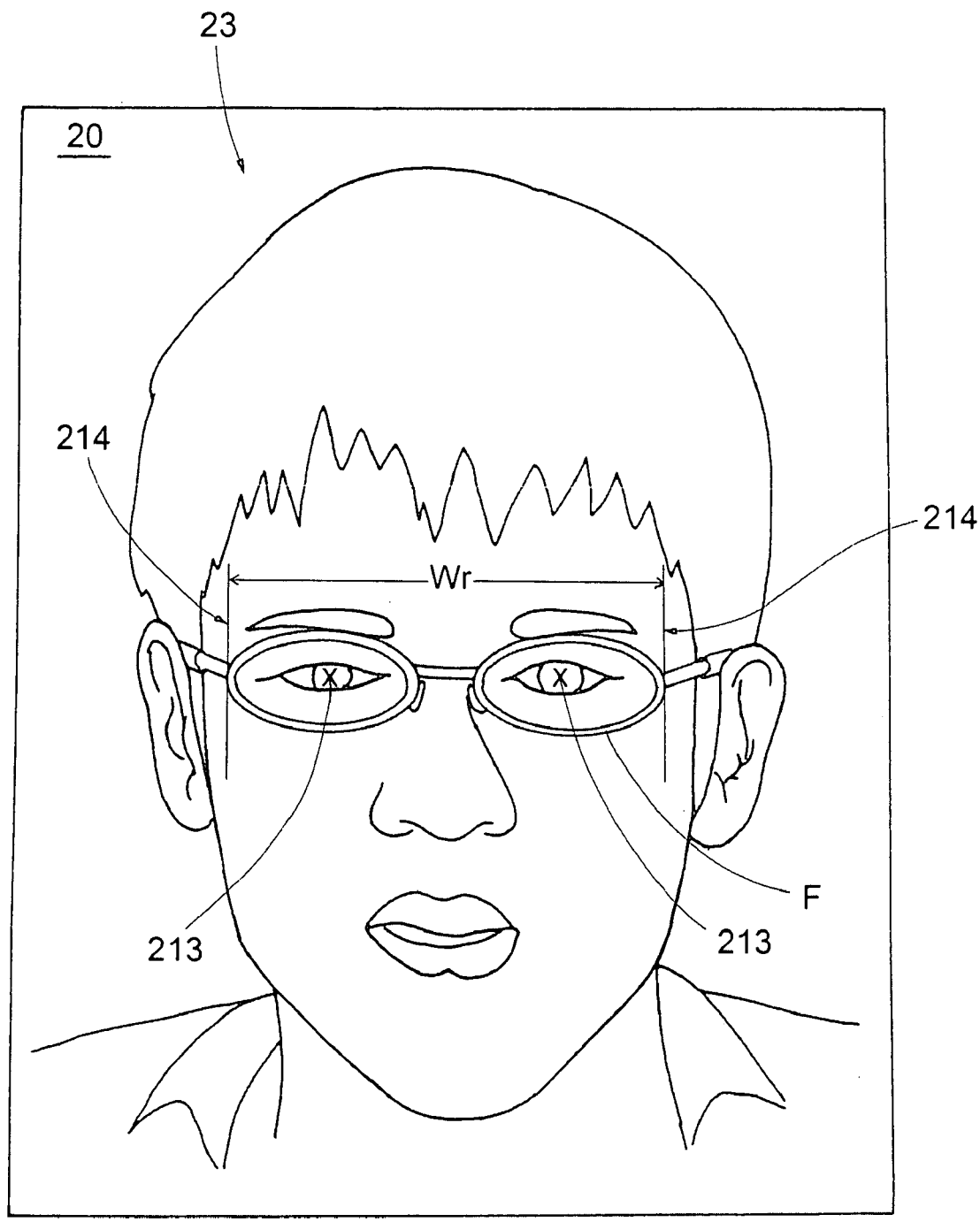
FIG. 7 illustrates a reference image layer of the production system according to the above preferred embodiment of the present invention.

As it is mentioned above, the spectacle frame requires a precise alignment for the wearer to wear. In other words, the image of spectacle frame must be match with the facial image that the reference marks 213 of the spectacle frame must be aligned with the pupils of the wearers. As shown in FIG. 7, the method of the present invention, before the step (1), further comprises a pre-step of calibrating a frame scale of the spectacle image with respect to the facial image, wherein the calibrating step comprises the following steps.

(A) Post a reference image layer 23 which contains an image of the wearer wearing a personal product, such as an own spectacle frame, which the wearer can substantially measure a front width of two reference points of the personal product that is illustrated in the image of the wearer.

(B) Locate the two reference marks 213 at the pupils of the wearer of the images on the reference image layer 23.

(C) Determine a reference width Wr of the own spectacle frame F on the reference image layer 23 by an indication of the two reference points such as two outer sides of the own spectacle frame F.

(D) Determine an actual width of the personal product, i.e. the distance between the two reference points, such as the own spectacle frame F by actually measuring the actual width thereof by the wearer, such that by comparing the reference width Wr of the own spectacle frame F on the reference image layer 23 with the actual width of the own spectacle frame F, a distance between the pupils of the wearer is determined to match with the frame scale of the spectacle image with respect to the facial image of the wearer on the base image layer 21.

It is worth to mention that the calibrating step of the present invention is adapted to determine the distance between the pupils of the wearer through the system.

The system of the present invention further comprises a frame calibrator 40 for calibrating the frame scale of the spectacle image with respect to the facial image, wherein the frame calibrator 40 is communicatively linked to the posting platform 20 for posting the reference image layer 23 to locate the two reference marks 213 at the pupils of the wearer of the images on the reference image layer 23, wherein the frame calibrator 40 comprises a scale processor 41 not only comparing the reference width Wr of the own spectacle frame F on the reference image layer 23 with the actual width of the own spectacle frame F but also determining the distance between the pupils of the wearer to match with the frame scale of the spectacle image with respect to the facial image of the wearer on the base image layer 21.

In the step (A), the wearer is able to post his or her facial image, preferably a full frontal photo as the facial image, on the posting platform 20. Accordingly, when the full frontal photo of the wearer is posted on the posting platform 20, the facial image will shown two pupils of the wearer and the frontal photo of the own spectacle frame F on the full frontal photo of the wearer.

In the step (B), when the two reference marks 213 are located at the pupils of the wearer of the images on the reference image layer 23, the scale processor 41 will determine the distance between the two reference marks 213 to represent the distance of the pupils of the wearer.

In the step (C), the wearer is able to pin-point the two outer sides of the own spectacle frame on the reference image layer 23 to indicate the reference width Wr of the own spectacle frame F thereon the reference image layer 23, wherein the scale processor 41 will read the reference width Wr corresponding to the distance between the two reference marks 213. Accordingly, the two masking marks 214 or 214' are selectively moved by the wearer until the masking marks 214 or 214' are located at the outer sides of the own spectacle frame F on the reference image layer 23 to indicate the reference width Wr of the own spectacle frame F.

In the step (D), the wearer is able to physically measure the actual width of the own spectacle frame F by a measuring tool such as ruler. It is easily for the wearer to measure the actual width of the own spectacle frame F between the outer sides thereof in responsive to the outer sides of the own spectacle frame F on the reference image layer 23 being pin-pointed in the step (C). It is worth to mention that the wearer is able to measure the actual distance between the pupil marks of the own spectacle frame F in the step (D). However, it is hard and inaccurate for the wearer to determine the distance between the pupil marks of the own spectacle frame F comparing with the determination of the distance between the outer sides of the own spectacle frame F. Once the data of the actual width of the own spectacle frame F is input, the frame calibrator 40 will determine the actual distance between the pupils of the wearer and will match the frame scale of the spectacle image with respect to the facial image of the wearer on the base image layer 21.

Figure 8A:
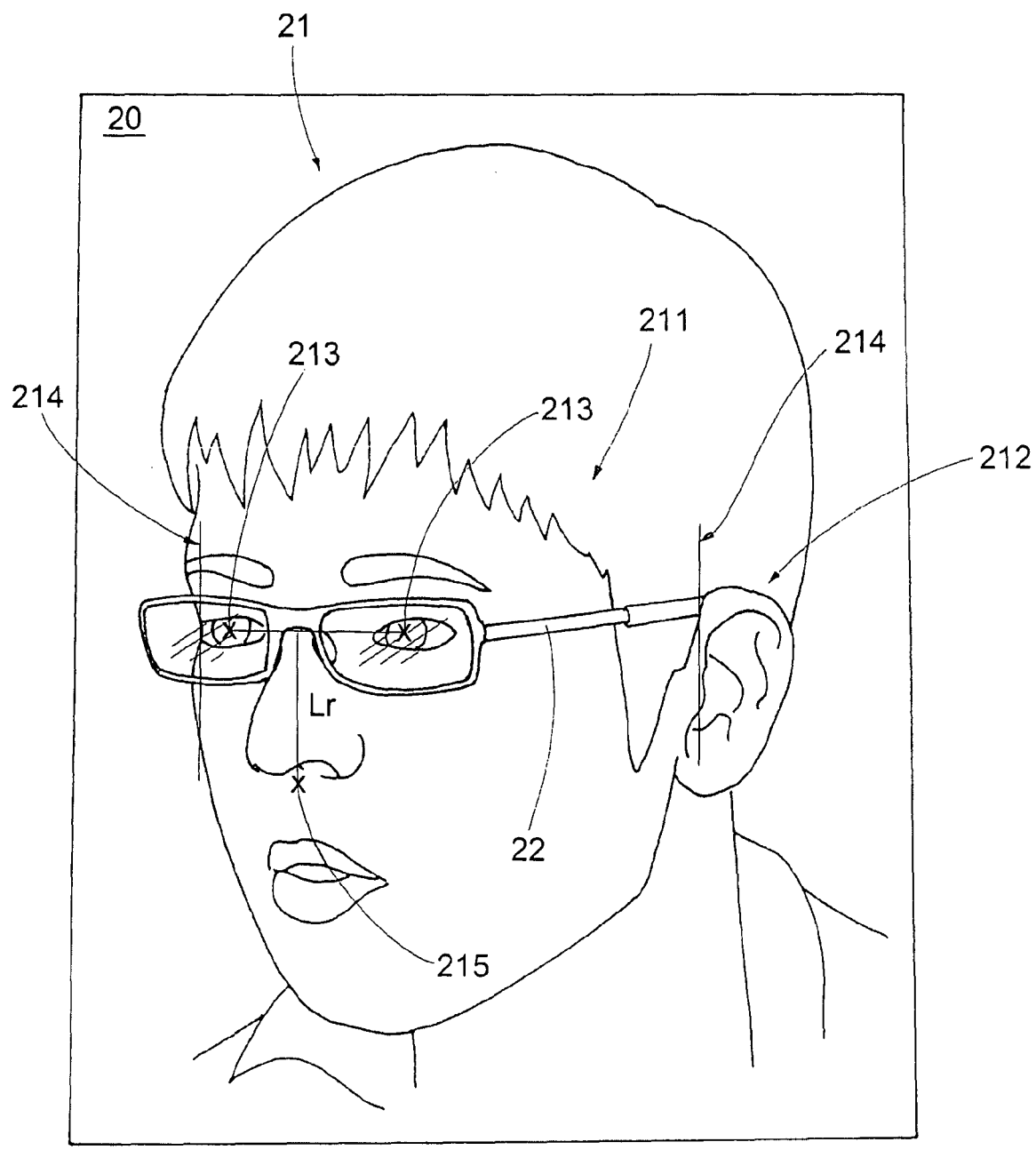
FIGS. 8A and 8B illustrate the test-wearing image of the production system according to the above preferred embodiment of the present invention, wherein the three quarter face position is shown on the base image layer.
Figure 8B:
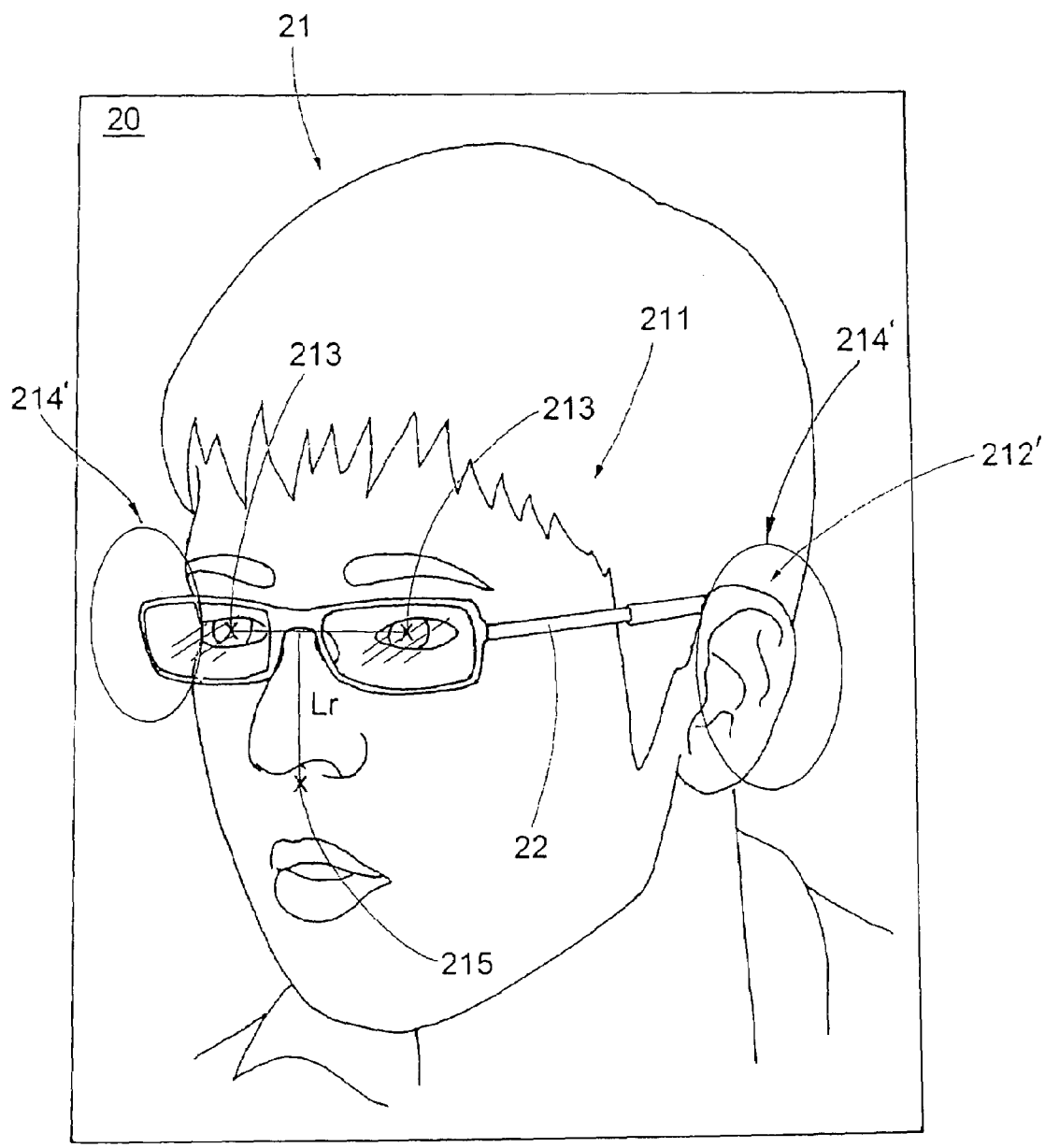
Figure 9A:
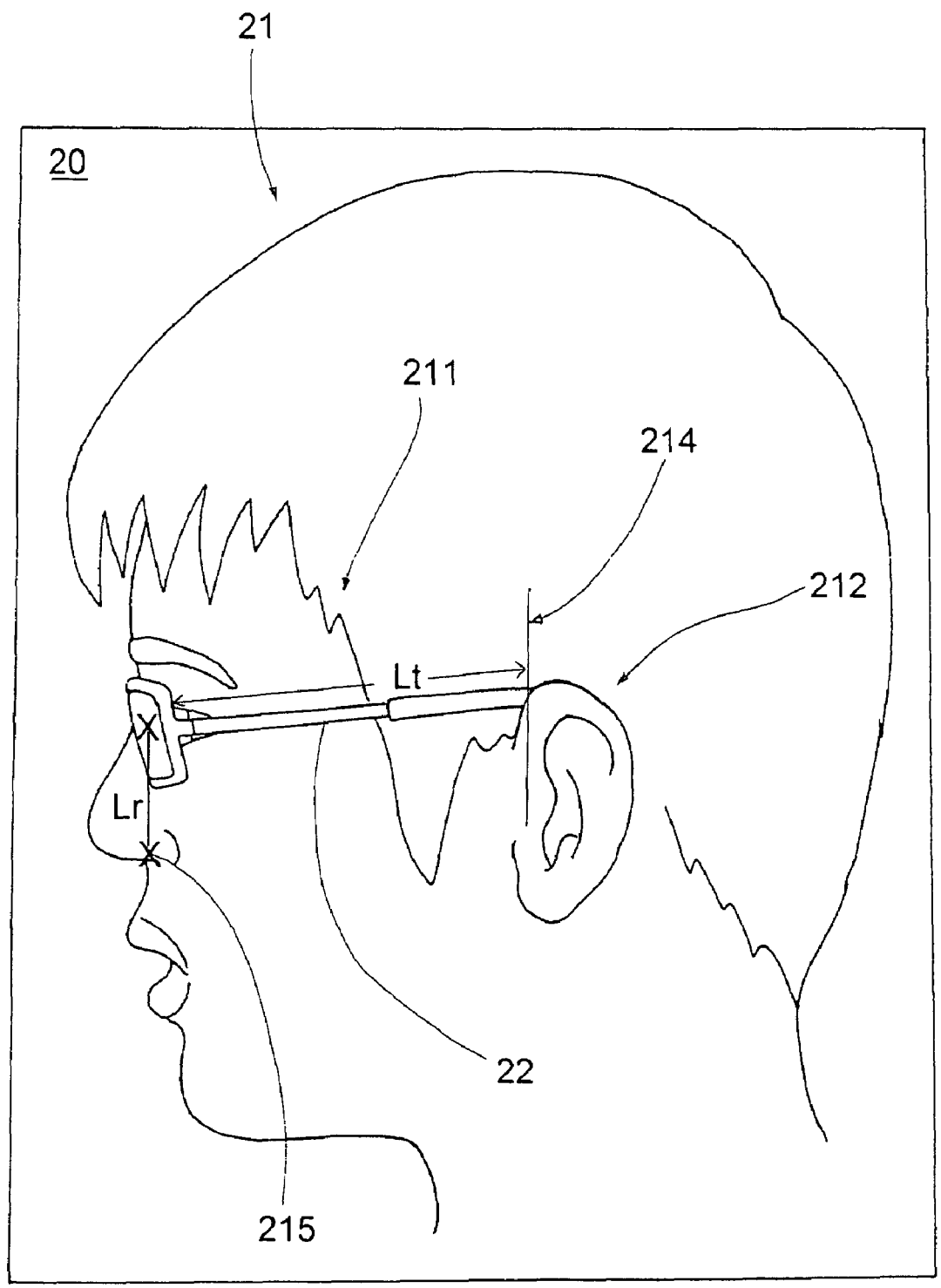
FIGS. 9A and 9B illustrate the test-wearing image of the production system according to the above preferred embodiment of the present invention, wherein the side face position is shown on the base image layer.
Figure 9B:
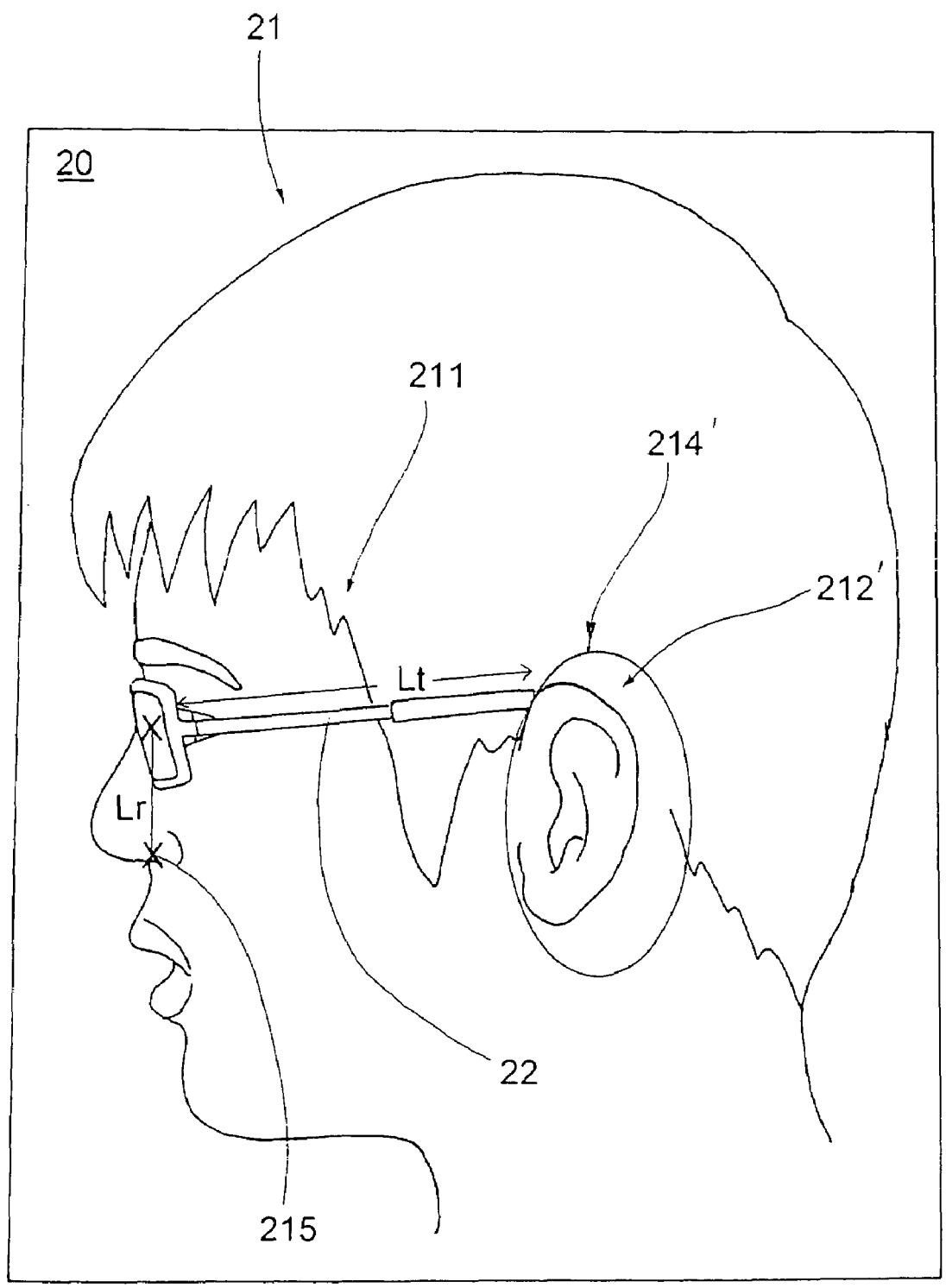

As it is mentioned above, the facial image is a full frontal photo posted on the posting platform 20. The wearer is able to post the facial image in different angles, such as a three quarter face position as shown in FIGS. 8A and 8B or side face position as shown in FIGS. 9A and 9B, for matching with different orientations of the images of the spectacle frame.

After the actual distance between the pupils of the wearer is defined, the system of the present invention will determine the angle of the facial position of the wearer on the base image layer 21.

Accordingly, the wearer is able to locate a third reference mark 215 at the base image layer 21 after the step (B) to determine a reference proportion of the facial image with respect to the distance between the pupils of the wearer. Preferably, as shown in FIGS. 4B and 4C the third reference mark 215 is pin-pointed at the tip of the nose on the full frontal photo of the wearer. Therefore, the frame calibrator 40 will determine the reference length Lr of the nose of the wearer with respect to the distance of the pupils of the wearer. When the facial image of the wearer is changed from the full frontal position to the three quarter face position or even the side face position, the frame calibrator 40 will keep the reference length Lr of the nose of the wearer as a reference data to selectively adjust the size of the facial image in responsive to the full frontal position of the facial image.

In particularly, the reference length Lr of the nose of the wearer on the base image layer 21 is set as a constant such that when the head of the wear on the base image layer 21 is rotated, the distance between the two reference marks 213 will be correspondingly changed. For example, the distance between the reference marks 213 is maximized on the base image layer 21 when the full frontal position of the facial image is provided thereon. When the position of the facial image is changed with respect to the rotational movement of the head of the wearer, as shown in FIGS. 8A to 9B, the system of the present invention will set the reference length Lr of the nose of the wearer as a constant and will determine the distance between the reference marks 213. By determining the ratio between the reference length Lr of the nose of the wearer and the changed distance between the reference marks 213, the angle of the head of the wearer on the base image layer 21 can be measured. When the position of the facial image is changed to the side face position, as shown in FIGS. 9A and 9B, the reference marks 213 are overlapped to form a single mark. Therefore, the system will determine the position of the facial image is changed 90° from the full frontal position to the side face position.

Therefore, the images of the spectacle frames with the corresponding orientations will match with the angles of the facial image to overlap the product image layer 22A on the base image layer 21. For example, the image of the spectacle frame with the three quarter face position will match with the facial image of the wearer with the three quarter face position.

It is worth to mention that the wearer is able to post a video clip of the facial image on the posting platform 20 to show the 360° rotational position of the face position, such that the images of the spectacle frame will match with the facial image of the video clip to illustrate a 360° rotational orientation of the facial image of the wearer wearing the corresponding spectacle frame.

Furthermore, the system further defines a temple wearable length Lt of the spectacle image on the product image layer 22 in responsive to an actual temple wearable length of the spectacle frame. When the side facial position of the wearer is posted oil the base image layer 21, as shown in FIGS. 9A and 9B, the display area 211 is defined between the frame body and the auricle areas of the facial image while the masking area 212 or 212' is defined at the auricle areas of the facial image. Accordingly, the dimension of the facial image on the base image layer 21 is set proportionally. Once the actual distance between the pupils of the wearer is defined, other dimensions of the spectacle frame can be proportionally determined. When the distance between the pupils of the wearer is found, the reference length Lr of the nose of the wearer is correspondingly determined. By using the reference length Lr of the nose of the wearer, the temple wearable length Lt of the spectacle image will be determined.

Accordingly, the temple wearable length Lt of the spectacle image is the distance between the reference mark 213 (located at the pupil of the wearer on the base image layer 21) and the masking mark 214 or 214' (located at the auricle areas of the facial image). It is worth to mention that when the wearer physically wears the spectacle frame, a straight portion of the temple is visibly located at the face of the wearer while the curving tail portion of the temple is invisibly passed over the ear of the wearer. In other words, the spectacles must be defined at a point on the temple to be bent to form the straight portion and the tail portion. Accordingly, the temple wearable length of the temple is the straight portion of the temple.

According to the preferred embodiment, after the reference marks 213 are located on the base image layer 21 to define the display area 211 and the masking area 212 or 212' in the step (2.1), the step (2) further comprises a step (2.2) of selectively adjusting the masking marks 214 or 214' at the facial side peripherals of the facial image respectively on the base image layer 21 to precisely define the display area 211 between the two masking marks 214 or 214' and the masking area 212 or 212' out of each of the masking marks 214 or 214'.

When the wearer selects the image of the model wearer to be posted on the posting platform 20 in the step (3), the display area 211 and the masking area 212 or 212' are preset on the base image layer 21. In other words, the wearer is not required to adjust the masking marks 214 or 214'. However, when the wearer posts his or her image on the posting platform 20, he or she may need to fine tune the display area 211 and the masking area 212, 212' to fit the shape of the face of the wearer. Accordingly, when the wearer locates the reference marks 213 at two pupils of the wearer of the image thereof, the masking marks 214, 214' are automatically formed. The user is able to adjust the position of each of the masking marks 214, 214' until the masking mark 214, 214' is moved to align with the corresponding facial peripheral of the facial image. It is worth to mention that when the wearer has a long hair that the hair covers the facial peripheral of the facial image, the wearer is able to move the masking mark 214, 214' to the peripheral of the hair in which the portion of the spectacle frame is also covered by the hair in a hidden manner.

It is worth to mention that the distance between the two masking marks 214, 214' is set to be larger than the distance between the two reference marks 213. Therefore, the wearer is restricted to move each of the masking mark 214, 214' between the two reference marks 213. In other words, each of the reference marks 213 must be located between the two masking marks 214, 214'.

Once the base image layer 21 is set, the wearer is able to select the desired image of the spectacle frame in the product database 11. Then, the selected image of the spectacle frame, as shown in FIG. 5, is posted on the posting platform 20 as the product image layer 21. It is worth to mention that the product image layer 21 is automatically aligned with the base image layer 21. In particularly, the pupil marks of the spectacle frame on the product image layer 22 are aligned with the pupils of the wearer on the base image layer 21.

As shown in FIGS. 6A and 6B, the frame body of the spectacle frame on the product image layer 22 is located within the display area 211 of the base image layer 21. Front portions of the temples of the spectacle frame on the product image layer 22 are also located within the display area 211 of the base image layer 21. However, the two tail portions of the temples of the spectacle frame on the product image layer 22 are located within the masking areas 212, 212' of the base image layer 21. Therefore, the frame body and the front portions of the temples of the spectacle frame will be visibly displayed on the base image layer 21 while the tail portions of the temples of the spectacle frame will be invisibly hidden on the base image layer 21.

It is appreciated that the product image layer 22 can be selectively moved to overlap at a desired location of the base image layer 21. Accordingly, the wearer is able to drag the product image layer 22 to move while the base image layer 21 is fixed on the posting platform 20 so as to selectively move the image of the spectacle frame on the facial image of the wearer. Therefore, the wearer can adjust the location of the product image layer 22 with respect to the base image layer 21. For example, some wearers would like to physically wear the own spectacle frame at a position that the pupil marks of the spectacle frame are slightly offset with the pupils of the wearer.

Accordingly, when the product image layer 22 is moved, a portion of the frame body of the spectacle frame on the product image layer 22 may be located within the masking area 212, 212' of the base image layer 21. Therefore, the portion of the frame body will be invisibly hidden.

Figure 6C:
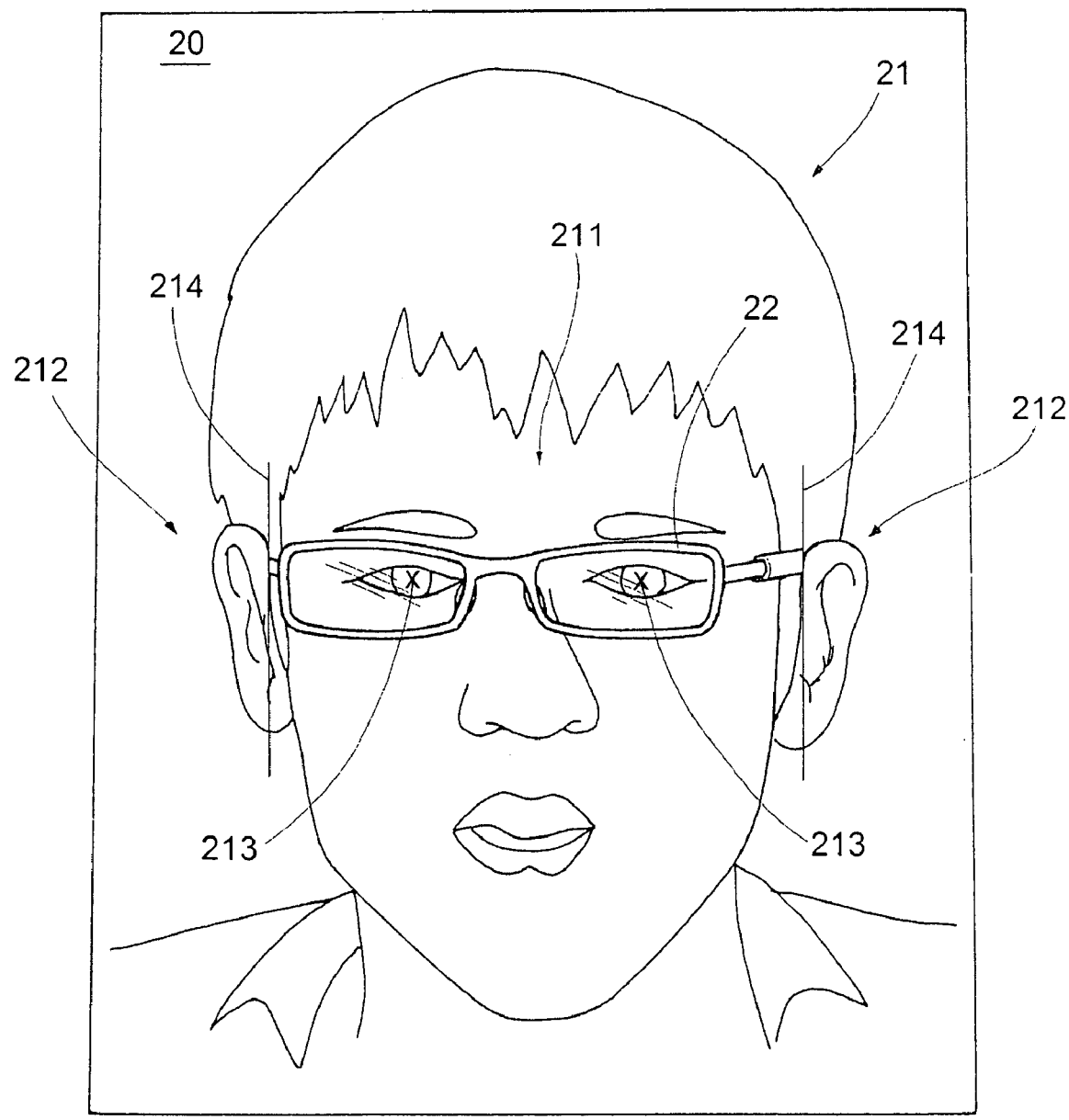
FIGS. 6C and 6D illustrate the product image layer locating on the base image layer in an adjustably movable manner.

As shown in FIG. 6C, the product image layer 22 is moved to the left side on the base image layer 21. The frame body of the spectacle frame on the product image layer 22 is moved closer to the left masking area 212, 212' while the frame body of the spectacle frame on the product image layer 22 is moved away from the right masking area 212, 212'. Therefore, the tail portion of the left temple on the product image layer 22 becomes shorter while the tail portion of the right temple on the product image layer 22 becomes longer.

In order to prevent the diminution the frame body of the spectacle frame on the product image layer 22, the product image layer 22 contains a preset reserving area 221 at the image of the personal product that the reserving area 221 is visibly shown within both the display area 211 and the masking area 212, 212', as shown in FIG. 5. Preferably, the reserving area 221 is preset on the product image layer 22.

In this spectacle frame example, the reserving area 221 is preset at the area of the image of the frame body of the spectacle frame. In other words, the image of the frame body will not be hidden within the masking area 212, 212'.

For better operation, the masking area 212, 212' of the base image layer 21 is adjustably changed in responsive to the movement of the product image layer 22. In particularly, the sizes of the display area 211 and the masking area 212, 212' of the base image layer 21 are correspondingly adjusted in responsive to the reserving area 221.

When the reserving area 221 is moved to the masking area 212, 212' from the display area 211, the size of the masking area 212, 212' is reduced while the display area 211 is enlarged, such that the reserving area 211 of the image of the personal product is always visibly shown on the base image layer 21. Likewise, when the reserving area 221 is moved back from the masking area 212, 212' to the display area 211, the display area 211 will be reduced back to its original size. In other words, once the display area 211 is set in the step (2), the minimum size of the display area 211 is set. The wearer is able to adjust the display area 211 in the step (2).

In order to adjust the size of the display area 211, the reserving area 221 of the image of the personal product defines an outer reserving boundary 222 arranged in such a manner that when the reserving area 221 is moved until the reserving boundary 222 meets one of the masking marks 214, the corresponding masking mark 214 is moved to adjust the size of the display area 211.

Figure 6D:
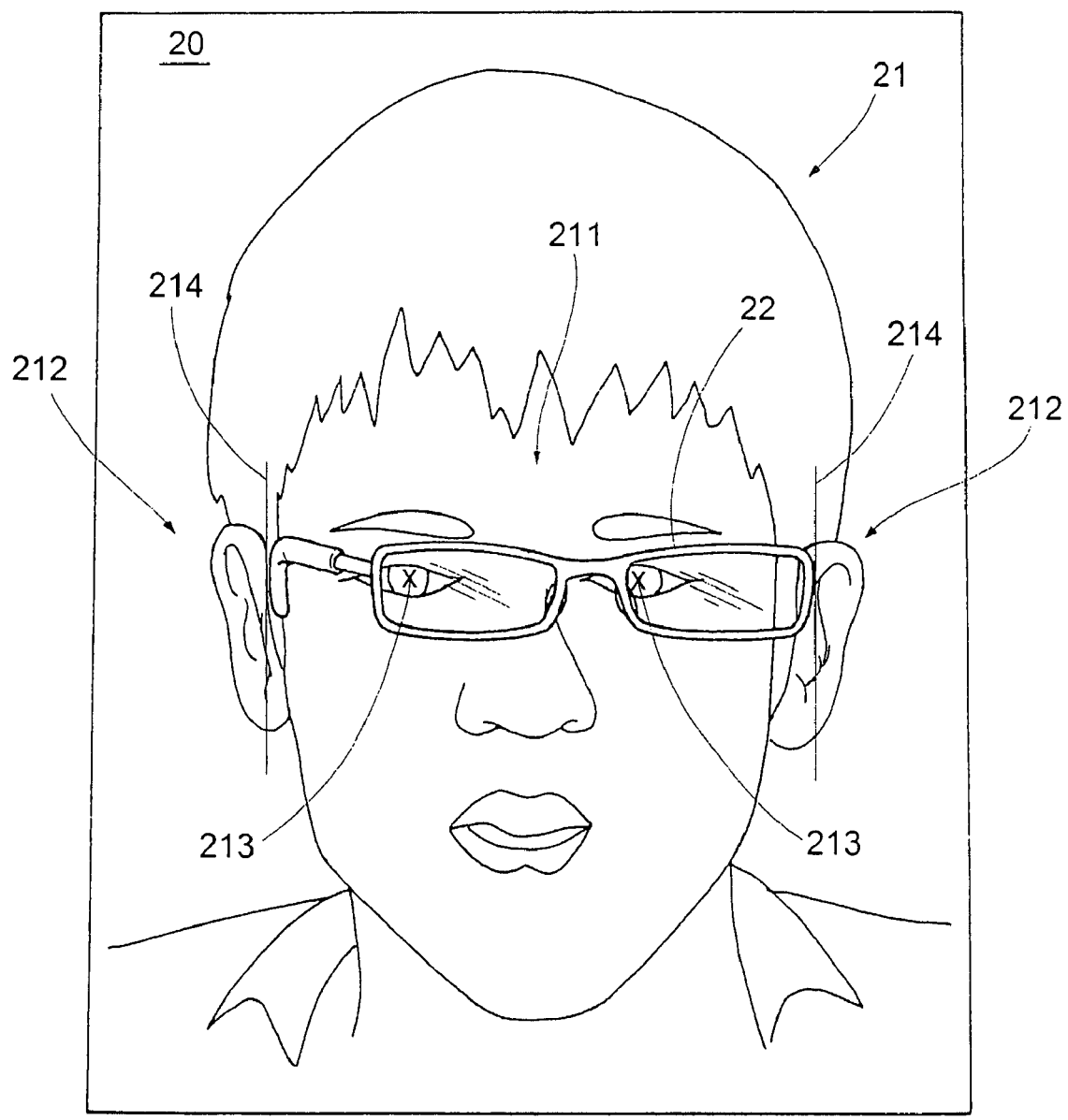

As shown in FIG. 6D, the product image layer 22 is moved to the right side on the base image layer 21. The right outer reserving boundary 222, i.e. the frame body of the spectacle frame on the product image layer 22, is moved to meet the right masking area 212, 212' while the left right outer reserving boundary 222 is moved away from the left masking area 212, 212'. Therefore, the tail portion of the left temple on the product image layer 22 becomes longer while the right temple on the product image layer 22 is hidden. In addition, the right masking area 212, 212' is moved to the right side in responsive to the right outer reserving boundary 222.

Back to the spectacle example, the reserving boundary 222 is defined at each outer border of the reserving area 221 which is the outer side of the frame body, as shown in FIG. 5. When the image of the spectacle frame on the product image layer 22 is moved, i.e. moving left or right on the base image layer 21, the reserving boundary 222 may meet one of the masking marks 214. In particularly, when the outer side of the frame body meets the respective masking mark 214, the masking mark 214 will be moved corresponding to the outer side of the frame body. For example, when the wearer moves the product image layer 22 to the right direction, the right outer side of the frame body, i.e. the right reserving boundary 222 of the reserving area 221, will meet the right masking mark 214, 214'. Once the wearer keeps moving the product image layer 22 to the right direction, the right masking mark 214, 214' will be correspondingly moved to the right direction followed by the right reserving boundary 222. Therefore, the display area 211 defining between the left and right masking marks 214, 214' will be enlarged while the right masking area 212, 212' will be reduced. Once the wearer moves back the product image layer 22 to the left direction, the right masking mark 214, 214' will be correspondingly moved to the left direction followed by the right reserving boundary 222. Accordingly, the right masking mark 214, 214' will be stopped moving to the left direction when the right masking mark 214, 214' is returned back to its original position. In other words, the right masking mark 214, 214' will only be moved back to its original position even though the product image layer 22 is kept moving to the left direction. In addition, the display area 211 can be adjusted by the moving the masking mark 214, 214' in the step (2).

The product image layer 22 further contains an image effect generator 24 to enhance the test-wearing image of the virtual appearance of the wearer physically wearing the personal product. According to the preferred embodiment, the product image layer 22 further contains a fade out effect to gradually diminish the image of the personal product from the display area 211 to the masking area 212, 212' of the base image layer 21 for enhancing the test-wearing image of the virtual appearance of the wearer actually wearing the personal product.

Accordingly, the fade out effect is applied at the front portion of each of the temples of the spectacle frame on the product image layer 22 because the front portion of each of the temples is extended from the display area 211 to the masking area 212, 212'. Therefore, the front portion of each of the temples is gradually faded out on the product image layer 22 until the rear portion of each of the temples is invisibly diminished.

The product image layer 22 further contains a light reflective effect provided within the reserving area 221 to generate a light reflection of the image of the personal product for enhancing the test-wearing image of the virtual appearance of the wearer actually wearing the personal product. In particularly, the light reflective effect is applied at each of the lenses of the spectacle frame on the product image layer 22. It is worth to mention that when the frame body of the spectacle frame is made of metal, the frame body may also reflect the light. Therefore, the light reflective effect can also applied at the frame body of the spectacle frame on the product image layer 22 to enhance the photo realistic effect of the test-wearing image.

The product image layer 22 further contains a shading effect provided at the image of the personal product to simulate a shading of the personal product on the image of the wearer. Accordingly, when light is projected on the spectacle frame, the shading of the spectacle frame may be projected on the face of the wearer. Therefore, when the product image layer 22 is overlapped on the base image layer 21, the shading effect will applied on the image of the spectacle frame to the facial image of the wearer.

The product image layer 22 further contains a color blending effect provided at the image of the personal product to blend a color of the image of the personal product with a color of the image of the wearer. In particularly, when the frame body is made of transparent material, the skin color of the wearer may show on the frame body. In this spectacle example, the nose supports of the spectacle frame are made of transparent material. Therefore, the color blending effect is applied at each of the nose supports of the spectacle frame on the product image layer 22 to show the skin color of the facial image on the base image layer 21.

According to the preferred embodiment, the wearer is able to select different product image layers 22 to overlap on the base image layer 21 in the step (3), wherein the system of the present invention will save the setting including the display area 211 and the masking area 212, 212' on the base image layer 21 in the step (2) unless the wearer changes the setting thereof. In addition, more than one product image layers 22 can be selected to overlap on the base image layer 21. In the spectacle example, the wearer is allowed to select one product image layer 22 to overlap on the base image layer 21 at one time because the wearer can only wear one spectacle frame at one time. For selecting the jewelries, two or more product image layers 22, such as ear ring and necklace, can be selected at the same time to overlap on the base image layer 21 at different locations thereof.

The following example illustrates the operation of the wearer test-wearing the watch to create the test-wearing image contains a virtual appearance of the wearer physically wearing the watch.

Accordingly, the wearer is able to post his or her image on the posting platform 20 in the step (1), wherein the image of the wearer contains a frontal wrist image thereof where the watch is worn. Likewise, the wearer is able to select the image of the model wearer on the posting platform 20.

Then, the wearer is able to define the display area 211 and the masking area 212 on the base image layer 21 in the step (2). Firstly, the wearer is able to locate one reference mark 213 on the base image layer 21 at a center of the frontal wrist image thereof.

If the masking mark 214 is a masking line, two masking marks 214 are automatically formed at the side peripherals of the wrist image respectively on the base image layer 21. The wearer is able to selectively adjust each of the masking marks 214 to fittingly align at the respective side peripheral of the wrist image. Therefore, the display area 211 is then defined between the two masking marks 214 and the masking area 212 is then defined at an area out of the masking marks 214.

If the masking mark 214' is an oval shaped masking mark 214', the oval masking mark 214' is automatically formed with two sides thereof located at the side peripherals of the wrist image respectively on the base image layer 21. The wearer is able to selectively adjust the size of the masking mark 214' to fittingly align at the right and left side peripherals of the wrist image. Therefore, the display area 211 is then defined as the area within the masking mark 214' and the masking area 212' is then defined at the area out of the masking mark 214'.

In the step (3), the wearer is able to select the image of the watch as the product image layer 22 to be posted on the posting platform 20. Accordingly, the image of the watch contains a watch body portion and strap portion. Once the image of the watch is selected, the system of the present invention will automatically align the center of the watch body portion to the reference mark 213 on the base image layer 21. The wearer is able to adjustably move and rotate the image of the watch until the image of the watch body portion on the product image layer 22 is fittingly overlapped on the image of the wrist of the wearer on the base image layer 21. Therefore, the image of the watch body portion and parts of the strap are located within the display area 211 to be visibly displayed on the base image layer 21 while the image of portions of the strap will be located within the masking area 212, 212' such that the portions of the strap will be invisibly hidden.

At the same time, the reserving area 221 and the reserving boundary 222 are also preset when the display area 211 is set. The reserving area 221 is set at the image of the watch body portion while the reserving boundary 222 is set at the boundary of the image of the watch body portion.

It is worth mentioning that the wearer is able to locate two reference marks at the side peripherals of the wrist image respectively on the reference image layer 23 or the base image layer. Therefore, the wearer is able to measure the actual width of the wrist of the wearer and input the actual width thereof to the system, wherein the frame calibrator 40 will calibrate the frame scale of the watch image with respect to the image of the wrist.

The product image layer 22 further applies the fade out effect at the image of the watch to gradually diminish the image of the strap of the watch extended from the display area 211 to the masking area 212. The light reflective effect is applied at the image of the watch body portion and/or the strap, especially at the lens of the watch body portion. The shading effect is taken place on the base image layer 21 at image of the wrist where the image of the watch is located. The color blending effect may be applied when the strap of the watch is made of transparent material.

Another example illustrates the operation of the wearer test-wearing the necklace to create the test-wearing image contains a virtual appearance of the wearer physically wearing the necklace.

Accordingly, the wearer is able to post his or her image on the posting platform 20 in the step (1), wherein the image of the wearer contains a frontal collar image thereof where the necklace is worn around the neck of the wearer. Likewise, the wearer is able to select the image of the model wearer on the posting platform 20.

Then, the wearer is able to define the display area 211 and the masking area 212, 212' on the base image layer 21 in the step (2). Firstly, the wearer is able to locate one reference mark 213 on the base image layer 21 at a pendant point of the frontal collar image thereof. Then, one or more masking marks 214, 214' are automatically formed at the neck peripherals of the collar image respectively on the base image layer 21. The wearer is able to selectively adjust each of the masking marks 214, 214' to fittingly align at the respective neck peripheral of the collar image. Therefore, if the masking marks 214 are two masking lines, the display area 211 is then defined between the two masking marks 214 and the masking area 212 is then defined at an area out of the masking marks 214. If the masking mark 214' is an oval shaped masking mark having two sides located at the neck peripherals of the collar image respectively on the base image layer 21, the display area 211 is defined as the encircled area within the oval masking mark 214' and the masking area 212' is then defined at the area outside the masking mark 214'.

In the step (3), the wearer is able to select the image of the necklace as the product image layer 22 to be posted on the posting platform 20. Accordingly, the image of the necklace contains a necklace body and a pendant. Once the image of the necklace is selected, the system of the present invention will automatically align the pendant of the necklace to the reference mark 213 on the base image layer 21. The wearer is able to adjustably move and rotate the image of the necklace until the image of the necklace body on the product image layer 22 is fittingly overlapped on the image of the collar of the wearer on the base image layer 21. Therefore, the image of the pendant and parts of the necklace body are located within the display area 211 to be visibly displayed on the base image layer 21 while the image of portions of the necklace body will be located within the masking area 212 such that the portions of the necklace body will be invisibly hidden.

At the same time, the reserving area 221 and the reserving boundary 222 are also preset when the display area 211 is set. The reserving area 221 is set at the image of the pendant while the reserving boundary 222 is set at the boundary of the image of the necklace body.

Accordingly, the system using "Macromedia Flash-Mask technique" is preferred to create the display area 211 and the masking area 212, 212' on the base image layer 21. Other techniques, which can create the above mentioned features, can be used as well. The main advantage of the present invention is that the system thereof will only require two different layers, i.e. the base image layer 21 and the product image layer 22, such that the system will save lots of memory space.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A test-wearing image producing method for a personal product, comprising the steps of:
   (a) posting a base image layer which contains an image of a wearer;
   (b) defining a display area on said base image layer and a masking area on said base image layer in responsive to said personal product to be worn by said wearer;
   (c) locating a product image layer on said base image layer, wherein said product image layer contains an image of said personal product; and
   (d) creating a test-wearing image when said product image layer is overlapped on said base image layer, wherein a portion of said image of said personal product within said display area is visibly shown on said image of said wearer while a portion of said image of said personal product within said masking area is invisibly hidden, such that said test-wearing image contains a virtual appearance of said wearer wearing said personal product.

2. The method, as recited in claim 1, wherein said image of said wearer is a facial image of said wearer and said image of said personal product is an image of a spectacle frame, wherein said product image layer is located on said base image layer in an adjustably movable manner, such that said test-wearing image contains said virtual appearance of said wearer wearing said spectacle frame.

3. The method, as recited in claim 2, wherein said display area is set between two facial side peripherals of said facial image while said masking area is set at each of auricle areas of said facial image, such that when said product image layer is overlapped on said base image layer, a corresponding portion of said image of said spectacle frame within said display area is visibly shown between said facial side peripherals of said facial image while another portion of said image of said spectacle frame within said masking area is invisibly hidden to generate said test-wearing image containing said virtual appearance of said wearer wearing said spectacle frame.

4. The method, as recited in claim 1, wherein the step (b) comprises a step of (b.1) locating one or more reference marks on said base image layer to define said display area and said masking area in responsive to said reference marks.

5. The method, as recited in claim 3, wherein the step (b) comprises a step of (b.1) locating one or more reference marks on said base image layer to define said display area and said masking area in responsive to said reference marks.

6. The method, as recited in claim 5, wherein two of said reference marks are selectively located at two pupils of said wearer of said image thereof and two masking marks are selectively located at said facial side peripherals of said facial image respectively on said base image layer.

7. The method, as recited in claim 6, wherein the step (b) further comprises a step of (b.2) selectively adjusting said masking marks at said facial side peripherals of said facial image respectively on said base image layer to define said display area between said two masking marks and said masking area out of each of said masking marks.

8. The method, as recited in claim 7, wherein a distance between said two masking marks is set to be larger than a distance between said two reference marks.

9. The method, as recited in claim 1, wherein said product image layer contains a preset reserving area at said image of said personal product that said reserving area is visibly shown within both said display area and said masking area.

10. The method, as recited in claim 8, wherein said product image layer contains a preset reserving area at said image of said personal product that said reserving area is visibly shown within both said display area and said masking area.

11. The method, as recited in claim 10, wherein sizes of said display area and said masking area of said base image layer are correspondingly adjusted in responsive to said reserving area that when said reserving area is moved to said masking area from said display area, the size of said masking area is reduced while said display area is enlarged, such that said reserving area of said image of said personal product is always visibly shown on said base image layer.

12. The method, as recited in claim 11, wherein said reserving area of said image of said personal product defines an outer reserving boundary arranged in such a manner that when said reserving area is moved until said reserving boundary meets one of said masking marks, said corresponding masking mark is moved to adjust the size of said display area.

13. The method, as recited in claim 12, wherein said product image layer further contains a fade out effect, a light reflective effect, a shading effect, and a color blending effect on said product image layer, wherein said fade out gradually diminishes said image of said personal product from said display area to said masking area of said base image layer, wherein said light reflective effect provided within said reserving area to generate a light reflection of said personal product, wherein said shading effect provided at said image of said personal product to simulate a shading of said personal product on said image of said wearer, wherein said color blending effect provided at said image of said personal product to blend a color of said image of said personal product with a color of said image of said wearer, such that said fade out effect, said light reflective effect, said shading effect, and said color blending effect enhance said test-wearing image of said virtual appearance of said wearer actually wearing said personal product.

14. The method, as recited in claim 6, before the step (a), further comprising a pre-step of calibrating a frame scale of said spectacle image with respect to said facial image, wherein said calibrating step comprises the steps of:
posting a reference image layer which contains an image of said wearer wearing an own personal product;
locating said two reference marks at said pupils of said wearer of said images on said reference image layer;
determining a reference width between two reference points of said own personal product on said reference image layer by an indication of said two reference points of said own personal product; and
determining an actual width between said two reference points of said own personal product by actually measuring said actual width thereof by said wearer, such that by comparing said reference width of said own personal product on said reference image layer with said actual width of said own personal product, a distance between said pupils of said wearer is determined to match with said frame scale of said spectacle image with respect to said facial image of said wearer on said base image layer.

15. The method, as recited in claim 12, before the step (a), further comprising a pre-step of calibrating a frame scale of said spectacle image with respect to said facial image, wherein said calibrating step comprises the steps of:
posting a reference image layer which contains an image of said wearer wearing an own personal product;
locating said two reference marks at said pupils of said wearer of said images on said reference image layer;
determining a reference width between two reference points of said own personal product on said reference image layer by an indication of said two reference points of said own personal product; and
determining an actual width between said two reference points of said own personal product by actually measuring said actual width thereof by said wearer, such that by comparing said reference width of said own personal product on said reference image layer with said actual width of said own personal product, a distance between said pupils of said wearer is determined to match with said frame scale of said spectacle image with respect to said facial image of said wearer on said base image layer.

16. The method, as recited in claim 14, wherein said own personal product is an own spectacle frame and said two reference points are two outer sides of said own spectacle frame, wherein said image of said wearer on said reference image layer is a frontal facial position of said wearer wearing said own spectacle frame, wherein said masking marks are moved to locate at two outer sides of said own spectacle frame on said reference image layer to define said reference width of said own spectacle frame.

17. The method, as recited in claim 15, wherein said own personal product is an own spectacle frame and said two reference points are two outer sides of said own spectacle frame, wherein said image of said wearer on said reference image layer is a frontal facial position of said wearer wearing said own spectacle frame, wherein said masking marks are moved to locate at two outer sides of said own spectacle frame on said reference image layer to define said reference width of said own spectacle frame.

18. The method, as recited in claim 15, wherein said calibrating step further comprises a step of locating a third reference mark at said base image layer to determine a reference proportion of said facial image with respect to said distance between said pupils of said wearer.

19. The method, as recited in claim 17, wherein said calibrating step further comprises a step of locating a third reference mark at said base image layer to determine a reference proportion of said facial image with respect to said distance between said pupils of said wearer.

20. The method, as recited in claim 18, wherein said third reference mark is located at a tip of a nose of said wearer on said base image layer to define a reference length of said nose of said wearer with respect to said distance of said pupils of said wearer on said base image layer, wherein when said facial position of said wearer is changed to adjust said distance between said reference marks, an angle of said facial position of said wearer on said base image layer is determined.

21. The method, as recited in claim 19, wherein said third reference mark is located at a tip of a nose of said wearer on said base image layer to define a reference length of said nose of said wearer with respect to said distance of said pupils of said wearer on said base image layer, wherein when said facial position of said wearer is changed to adjust said distance between said reference marks, an angle of said facial position of said wearer on said base image layer is determined.

22. The method, as recited in claim 20, wherein said image of said spectacle frame is correspondingly changed its orientation to match with said angle of said facial position of said wear to overlap said product image layer on said base image layer.

23. The method, as recited in claim 21, wherein said image of said spectacle frame is correspondingly changed its orientation to match with said angle of said facial position of said wear to overlap said product image layer on said base image layer.

24. The method, as recited in claim 21, wherein a temple wearable length of said spectacle image on said product image layer is determined in responsive to an actual temple wearable length of said spectacle frame, wherein said temple wearable length of said spectacle image is proportionally determined by said reference length of said nose of said wearer.

25. The method, as recited in claim 23, wherein a temple wearable length of said spectacle image on said product image layer is determined in responsive to an actual temple wearable length of said spectacle frame, wherein said temple wearable length of said spectacle image is proportionally determined by said reference length of said nose of said wearer.

26. A system of producing a test-wearing image for a personal product, comprising:
   an optimization center having a product database, which is adapted for a wearer to access, containing a plurality of digital images of personal products for said user to select;
   a posting platform, which is communicatively linked to said frame database, for said wearer posting a base image layer and a product image layer on said posting platform, wherein said base image layer contains an image of said wearer and said product image layer contains at least one of said images of said personal products;
   a test-wearing generator, which is communicatively linked to said posting platform, comprising a masking processor defining a display area on said base image layer and a masking area on said base image layer in responsive to said personal product being worn by said wearer, and a test-wearing image creator creating a test-wearing image when said product image layer is overlapped on said base image layer, wherein a portion of said image of said personal product within said display area is visibly shown on said image of said wearer while a portion of said image of said personal product within said masking area is invisibly hidden, such that said test-wearing image contains a virtual appearance of said wearer actually wearing said personal product.

27. The system, as recited in claim 26, wherein said product database contains images of spectacle frames for being selected by said wearer and for being overlapped on a facial image of said wearer of said base image layer.

28. The system, as recited in claim 27, wherein said masking processor defines said display area between two facial side peripherals of said facial image and said masking area at each of auricle areas of said facial image on said base image layer, such that when said product image layer is overlapped on said base image layer, a corresponding portion of said image of said spectacle frame within said display area is visibly shown between said facial side peripherals of said facial image while another portion of said image of said spectacle frame within said masking area is invisibly hidden to generate said test-wearing image containing said virtual appearance of said wearer wearing said spectacle frame.

29. The system, as recited in claim 28, wherein said masking processor contains one or more reference marks selectively located on said base image layer to define said display area and said masking area in responsive to said reference marks.

30. The system, as recited in claim 29, wherein two of said reference marks are selectively located at two pupils of said wearer of said image thereof to form two masking marks at said facial side peripherals of said facial image respectively on said base image layer, wherein a distance between said two masking marks is set to be larger than a distance between said two reference marks.

31. The system, as recited in claim 30, wherein said masking processor further modifies said product image layer to form a preset reserving area at said image of said personal product such that said reserving area is visibly shown within both said display area and said masking area.

32. The system, as recited in claim 31, further comprising a frame calibrator for calibrating a frame scale of said spectacle image with respect to said facial image, wherein said frame calibrator is communicatively linked to said posting platform for posting a reference image layer which contains an image of said wearer wearing an own spectacle frame for said wearer to locate said two reference marks at said pupils of said wearer of said images on said reference image layer, wherein said frame calibrator comprises a scale processor not only comparing a reference width of said own spectacle frame on said reference image layer with an actual width of said own spectacle frame but also determining a distance between said pupils of said wearer to match with said frame scale of said spectacle image with respect to said facial image of said wearer on said base image layer.

33. The system, as recited in claim 32, wherein said frame calibrator further determines a reference proportion of said facial image with respect to said distance between said pupils of said wearer, wherein an angle of said facial position of said wearer on said base image layer is determined in responsive to a change of said distance between said reference marks such that said image of said spectacle frame is correspondingly changed its orientation to match with said angle of said facial position of said wear to overlap said product image layer on said base image layer.

34. The system, as recited in claim 33, wherein said frame calibrator further determines a temple wearable length of said spectacle image on said product image layer is determined in responsive to an actual temple wearable length of said spectacle frame, wherein said temple wearable length of said spectacle image is proportionally determined by said reference length of said nose of said wearer.

* * * * *